United States Patent
Nelson et al.

(10) Patent No.: US 10,203,816 B2
(45) Date of Patent: Feb. 12, 2019

(54) APPARATUS AND METHOD FOR TFT FINGERPRINT SENSOR

(71) Applicant: Egis Technology Inc., Taipei (TW)

(72) Inventors: Richard B. Nelson, Chandler, AZ (US); Richard A. Erhart, Tempe, AZ (US)

(73) Assignee: EGIS TECHNOLOGY INC., Taipei (TW)

( * ) Notice: Subject to any disclaimer, the term of this patent is extended or adjusted under 35 U.S.C. 154(b) by 1195 days.

(21) Appl. No.: 14/244,534

(22) Filed: Apr. 3, 2014

(65) Prior Publication Data

US 2014/0333328 A1    Nov. 13, 2014

Related U.S. Application Data

(60) Provisional application No. 61/820,477, filed on May 7, 2013.

(51) Int. Cl.
  *G06F 3/044* (2006.01)
  *G06F 3/041* (2006.01)
  *G06K 9/00* (2006.01)

(52) U.S. Cl.
  CPC .............. *G06F 3/044* (2013.01); *G06F 3/041* (2013.01); *G06F 3/0416* (2013.01); *G06K 9/0002* (2013.01)

(58) Field of Classification Search
  CPC ............ G06F 3/044; G06F 3/041; G06K 9/00
  See application file for complete search history.

(56) References Cited

U.S. PATENT DOCUMENTS 5,325,442 A    6/1994 Knapp
5,952,588 A    9/1999 Young
(Continued)

FOREIGN PATENT DOCUMENTS

JP    2003-090703    3/2003
KR    10-2008-0005263    1/2008
(Continued)

OTHER PUBLICATIONS

Pranav Koundinya et al., "Multi Resolution Touch Panel with Built-in Fingerprint Sensing Support," Design, Automation and Test in Europe Conference and Exhibition, 2014, Mar. 2014, pp. 1-6, IEEE, US.

(Continued)

*Primary Examiner* — Huy Q Phan
*Assistant Examiner* — Adam Clarke

(57) ABSTRACT

A low cost, two-dimensional, fingerprint sensor includes a pixel array, each pixel including a switch and a pixel electrode for forming a capacitance with a fingertip. One or more active transmission electrodes are spaced from a selected row of the pixel array, and transmit a carrier signal into the finger without direct coupling into the selected pixels. Signals sensed by the pixel array are coupled to an independent integrated circuit, and connections between the IC and the pixel array are reduced by demultiplexing row select lines, and by multiplexing sensed column data. Differential sensing may be used to improve common mode noise rejection. The fingerprint sensor may be conveniently incorporated within a conventional touchpad LCD panel, and can mimic the performance of lower density touchpad pixels.

19 Claims, 16 Drawing Sheets

(56) References Cited

U.S. PATENT DOCUMENTS

| | | |
|---|---|---|
| 5,978,496 A | 11/1999 | Harkin |
| 6,055,324 A | 4/2000 | Fujieda |
| 6,108,438 A | 8/2000 | Bird et al. |
| 6,357,392 B1 | 3/2002 | Knapp |
| 6,370,965 B1 | 4/2002 | Knapp |
| 6,481,294 B2 | 11/2002 | Zellner et al. |
| 6,778,686 B1 | 8/2004 | Hestnes et al. |
| 6,885,439 B2 | 4/2005 | Fujieda |
| 7,099,497 B2 | 8/2006 | Chou et al. |
| 7,256,589 B2 | 8/2007 | Andrade |
| 7,259,573 B2 | 8/2007 | Andrade |
| 7,375,714 B2 | 5/2008 | Hara |
| 7,737,933 B2 | 6/2010 | Yamano et al. |
| 7,755,369 B2 | 7/2010 | Chuang et al. |
| 7,835,553 B2 | 11/2010 | Miyasaka |
| 7,864,992 B2 | 1/2011 | Riedijk et al. |
| 8,294,662 B2 | 10/2012 | Yamazaki |
| 8,421,890 B2 | 4/2013 | Benkley, III |
| 8,542,211 B2 | 9/2013 | Ellas |
| 8,723,825 B2 | 5/2014 | Wright et al. |
| 8,730,189 B2 | 5/2014 | Mamba et al. |
| 8,754,871 B2 | 6/2014 | Chang |
| 2003/0016024 A1* | 1/2003 | Teranuma ............ G06K 9/0002 324/519 |
| 2004/0051155 A1* | 3/2004 | Oka ..................... G06K 9/0002 257/414 |
| 2006/0017862 A1* | 1/2006 | Song .................. G02F 1/13338 349/42 |
| 2009/0067684 A1 | 3/2009 | Mainguet |
| 2011/0175703 A1* | 7/2011 | Benkley, III ....... G06K 9/00053 340/5.82 |
| 2012/0085822 A1 | 4/2012 | Setlak et al. |
| 2012/0092127 A1 | 4/2012 | Ganapathi et al. |
| 2012/0092279 A1 | 4/2012 | Martin |
| 2012/0092293 A1 | 4/2012 | Ganapathi et al. |
| 2012/0092294 A1 | 4/2012 | Ganapathi et al. |
| 2012/0154324 A1* | 6/2012 | Wright .................. G06F 3/0416 345/174 |
| 2013/0127779 A1* | 5/2013 | Lillie ................... G06F 3/0416 345/174 |
| 2013/0177220 A1 | 7/2013 | Erhart et al. |
| 2013/0200907 A1 | 8/2013 | Schnelder et al. |
| 2013/0231046 A1 | 9/2013 | Pope et al. |
| 2013/0241630 A1* | 9/2013 | Klein ..................... G06F 3/044 327/536 |
| 2014/0047706 A1 | 2/2014 | Shaikh et al. |
| 2014/0171158 A1 | 6/2014 | Setlak et al. |
| 2014/0300574 A1 | 10/2014 | Benkley, III et al. |

FOREIGN PATENT DOCUMENTS

| | | |
|---|---|---|
| KR | 10-2011-0138257 | 12/2011 |
| KR | 10-2012-0138886 | 12/2012 |
| KR | 10-2013-0069848 | 6/2013 |

OTHER PUBLICATIONS

Ryuichi Hashido et al., "A Capacitive Fingerprint Sensor Chip Using Low-Temperature Poly-Si TFTs on a Glass Subsrate and a Novel and Unique Sensing Method," IEEE Journal of Solid-State Circuits, Feb. 2003, pp. 274-280, vol. 38, No. 2, IEEE, US.
Hiroyuki Hara et al., "Low Temperature Poycrystalline Silicon TFT Fingerprint Sensor with Integrated Comparator Circuit," Solid-State Circuits Conference, 2004, ESSCIRC 2004, Proceedings of the 30th European, Sep. 2004, pp. 403-406, IEEE, US.
Korea Patent Office, Office Action, Patent Application Serial No. 10-2014-0153411, dated Nov. 6, 2014, Korea.
Korean Patent Office, Office Action, Patent Application Serial No. 10-2017-0105871, dated Nov. 21, 2017, Korea.
"Fingerprint sensor (glass cap sensor)", Model: GCS-2, pp. 1-2, believed to have been published before May 2, 2013.
United States Patent Office, Office Action, U.S. Appl. No. 14/817,149, dated Feb. 20, 2018, United States.

* cited by examiner

APPARATUS AND METHOD FOR TFT FINGERPRINT SENSOR

CROSS-REFERENCE TO RELATED APPLICATIONS

This application claims the benefit of the earlier filing date of U.S. provisional patent application No. 61/820,477, filed on May 7, 2013, for "Apparatus and Method for TFT Fingerprint Sensor", regarding all commonly-disclosed subject matter.

BACKGROUND OF THE INVENTION

1. Field of the Invention

The present invention relates generally to electronic fingerprint sensors, and more particularly to a fingerprint sensor using a thin-film transistor ("TFT") array to capacitively sense a user's fingerprint.

2. Description of the Related Art

Conventional fingerprint sensors currently being sourced to the commercial market use different methods for sensing a user's fingerprint. One type of fingerprint sensor includes a CMOS silicon chip having circuitry providing an arrayed multitude of "pixels". The CMOS silicon chip is then coated with a protective coating that may be formed from a simple chemical coating, a flex substrate, or other thin materials. This type of fingerprint sensor requires the silicon chip to be at least as large as the pixel array.

A second type of commercially available fingerprint sensor includes metal lines formed upon a substrate to form a pixel array, while a remotely-located silicon chip, of smaller dimensions than the pixel array, is electrically coupled thereto. This second type of fingerprint sensor can be implemented in several different packaging configurations, such as ball grid array (BGA), wafer level fan-out (WLFO), or a film substrate conformed around, or on top of, a plastic hump/stiffener.

Fingerprints are characterized by patterns of ridges and valleys that are present on the skin of a user's finger. Most of the current commercial fingerprint sensors are capacitive touch sensors, meaning that the circuitry used to derive a fingerprint image must be capable of differentiating small changes in a received signal that result from the capacitance induced by a finger "ridge" or "valley" positioned over the plate of a capacitive sensing element. These capacitive sensing elements are typically laid out in an array of X rows by Y columns, commonly referred to as a "pixel array". The intersection of each row with each column is referred to as a "pixel". These pixel arrays can be created by CMOS devices formed in a semiconductor integrated circuit chip itself, as in the first type of fingerprint sensor described above. Alternatively, the pixel array can be formed by metal lines formed upon on a non-semiconductor substrate material, as in the second type of fingerprint sensor described above.

The first type of fingerprint sensor described above results in a much higher-cost product, since the CMOS silicon chip in which the pixel array is formed must be at least the size of the fingerprint image required. In the case of a touch sensor, or 2D sensor, this can require a relatively large area of silicon, measuring three-quarters of an inch square or larger, making it relatively costly.

On the other hand, the second type of fingerprint sensor described above, wherein metal traces are formed upon a non-semiconductor substrate, often develop an inferior signal due to the limitations on the widths of the lines used to transmit and receive the signal from which the fingerprint image is derived. The smaller sizes of the transmitter and receivers, especially the transmitter, can also severely limit the thickness of material above the sensor.

A third type of fingerprint sensor that has been proposed uses a liquid crystal display (LCD), which is ordinarily used to display, rather than sense, information. In this third type of sensor, the LCD display itself is used to image and capture the fingerprint, providing a single device that is both a display and fingerprint sensor. This method proposes the use of the "column drivers" of the display to not only output information but to have an input mode that can sense a capacitance change on the pixels in the display. This method is extremely limited in signal strength because the column lines must be used as both transmission (Tx) lines and receiver (Rx) lines. For example, it has been proposed to use a "pre-charge" state on each pixel before the user's finger is applied, and then to detect the voltage change on each such pixel in the presence of the user's finger, thereby monitoring the capacitance provided by the ridge or valley of the finger over that pixel. The use of the column line as both Tx (precharge) and Rx (receive, or read) severely limits the signal to noise capabilities that this method can produce. In addition, this method is costly, as all of the column drivers must be designed to serve as both an output device (for normal display usage) and a highly sensitive input device (for fingerprint sensor usage).

In order for the above-described sensors to properly distinguish the "ridge" versus "valley" signal delta, the finger must be located as close as possible to the receiver plate(s) of the capacitor. Accordingly, suppliers of known fingerprint sensors strive to minimize the thickness of the receiver plate that overlies the capacitive plate of each pixel. However, as the receiver plate thickness is reduced, such fingerprint sensors are more easily damaged physically or mechanically because of the close proximity of the sensor surface to underlying electrical circuitry, thus reducing the durability and/or reliability of the sensor. For example, conventional BGA-style fingerprint sensors, as well as newer, more advanced "flexible" fingerprint sensors, which enable a user to swipe a finger across a polyimide surface without directly contacting the sensor circuitry, are both susceptible to this type of damage.

As explained above, current fingerprint sensors require that the user's fingertip be in close proximity to the fingerprint sensor circuitry in order to sufficiently distinguish the ridges and valleys of the fingertip. Accordingly, for the second type of fingerprint sensor described above, the thickness and material type used to protect the fingerprint sensor is severely limited. The protective coatings currently used to cover fingerprint sensors must be non-conductive, less than approximately 200 um thickness, and fit the aesthetic requirements of the customer. For example, a simple drop of a pen striking the exposed portion of the fingerprint sensor can damage the thin polyimide surface of the flexible fingerprint sensor, thus creating aesthetic defects and potentially damaging the sensor circuitry located just below the surface. The ability to place thicker materials over the sensor to add to the reliability of the fingerprint sensor is highly desirable. However, thicker protective coatings/surfaces introduce at least two new challenges: 1)—the signal strength from the signal transmitter, to the finger, then back to the receiver array, is greatly diminished as thickness of the cover increases, typically by the square of the increased distance (i.e., doubling the cover thickness reduces signal strength by a factor of four); and 2)—depending on how the transmitter signal is generated, the transmitter signal can be significantly de-focused as it travels from the transmitter to the receiver.

Among the fingerprint sensors that are currently available is a "Glass Cap Sensor" supplied by Silicon Display of South Korea under Model No. GCS-2. This device provides a poly silicon thin film transistor (TFT) capacitive pixel array of 256 rows by 360 columns, corresponding to 92,160 sensor cells. The pixel density corresponds to 508 dpi, and is provided within a sensing area measuring 12.8 mm by 18 mm. The pitch between successive pixels in the array is 350 micrometers. A gate/row shift register is formed on the integrated circuit and is used to select the active row of pixels to be sensed. Likewise, a column shift register is formed on the integrated circuit for selecting the columns to be sensed within the selected row. Four analog output sensing signals are provided at any given point in time. A multiplexer is also formed on the integrated circuit, and is used to select which column output sensing signals are selected at any given point in time. Applicants believe that the above-described Glass Cap Sensor is essentially a passive device that does not include any signal generating electrodes for radiating a high frequency signal proximate to the pixel array in order to detect the effective capacitance formed between each of the pixels of the array and the user's fingertip.

U.S. Pat. No. 6,055,324 to Fujieda discloses a fingerprint imaging device including a two-dimensional array of thin film transistors (TFTs) formed within a substrate, a dielectric layer formed above such substrate, and signal sensing electrodes formed on the dielectric layer. The signal sensing electrodes are connected to the source terminals of the thin film transistors. The gate electrodes of TFTs lying within the same row of the array are connected to a common gate electrode lead. The gate electrode leads are connected to output terminals of a shift register used to select which of the rows of the array is active. The drain electrodes of TFTs lying in the same column are connected to a common drain electrode lead. The drain electrode leads are connected to input terminals of a signal detecting circuit. A signal generating electrode is provided in the form of mesh or comb for surrounding the pixels of the two-dimensional array and for radiating a high frequency signal toward a finger overlying the array. The signal sensing electrodes of the array form electrostatic capacitances between the signal sensing electrodes and the user's finger. The signal received by each of the signal sensing electrodes is detected, row by row, to provide an image of a fingerprint. However, in Fujieda, the signal generating electrode is so highly enmeshed with each of signal sensing electrodes of the array that significant components of the radiated high frequency signal are directly capacitively coupled to the signal sensing electrodes without first passing through the user's finger. As a result, the difference in signal strength between a first signal sensing electrode lying below a ridge of the user's fingertip, and a second signal sensing electrode lying below a valley of the user's fingertip, is not nearly as pronounced as it should be. Moreover, as the thickness of the protective layer, separating the user's finger from the underlying signal sensing electrodes, is increased, the direct capacitive coupling of the radiated high frequency signal from the signal generating electrode to the array of signal sensing electrodes largely overwhelms any secondary coupling of the radiated high frequency signal through the user's finger.

As evidenced by the purchase of Authentec by Apple, the fingerprint sensor is a biometric security system with great potential in the cell phone, notebook, and laptop arena. Thus, the ability to embed a fingerprint sensor in an LCD panel, or to create a fingerprint sensor in a component which is common to many of these media, such as a button, is highly desirable.

Accordingly, it is an object of the present invention to provide a fingerprint sensor for imaging a person's fingerprint without requiring the use of an integrated circuit semiconductor chip of the same dimensions as the pixel array used to capture the image of the fingerprint.

Another object of the present invention is to provide such a fingerprint sensor which more readily distinguishes between the ridges and valleys of a fingertip applied to a cover plate overlying the pixel array used to image the fingerprint.

Still another object of the present invention is to provide such a fingerprint sensor wherein the cover layer, or coating, overlying the pixel array can be made of sufficient thickness to adequately protect the pixel array while still permitting the pixel array to readily distinguish between the ridges and valleys of an applied fingertip.

A further object of the present invention is to provide such a fingerprint sensor which can be manufactured at relatively low cost.

Yet a further object of the present invention is to provide such a fingerprint sensor which more effectively transmits a carrier electrical signal into the person's fingertip without simultaneously directly coupling such carrier signal into the pixel array.

A still further object of the present invention is to provide such a fingerprint sensor which reduces the number of electrical lines between the pixel array and an associated integrated circuit used to process the fingerprint image captured by the pixel array.

Yet another object of the present invention is to provide such a fingerprint sensor wherein the signal components monitored by each pixel within the pixel array can be sensed differentially to reject common mode noise signals.

Still another object of the present invention is to provide such a fingerprint sensor wherein the pixel array may be incorporated as a portion of a conventional touch-sensitive pad.

Another object of the present invention is to provide a fingerprint sensor which readily transmits a signal into the user's finger that can be sensed by the pixel array, but wherein the transmitted signal is not significantly directly coupled to the pixel array through the fingerprint sensor itself.

A still further object of the present invention is to provide a fingerprint sensor which can be easily combined with a conventional touchpad to provide a single device which can both image a user's fingerprint and detect that the user is touching a particular location of the touchpad, within the same sensing layers.

These and other objects of the present invention will become more apparent to those skilled in the art as the description of the present invention proceeds.

SUMMARY OF THE INVENTION

Briefly described, and in accordance with a preferred embodiment thereof, the present invention relates to a fingerprint sensor that includes a first substrate having a two dimensional array of pixels arranged in R rows and N columns. The first substrate may either be rigid or relatively flexible. Each pixel includes a switching device, preferably a TFT, and a capacitive plate proximate the upper surface of the first substrate. A series of R row addressing electrodes are provided, each row addressing electrode being coupled to the switching devices of the pixels in a corresponding row of the pixel array to selectively enable the switching devices in the corresponding pixel row. A series of N data electrodes are also provided, each data electrode being coupled to the switching devices of the pixels in a corresponding pixel column for sensing the signal provided by the capacitive plate of the pixel located at the intersection of the selected pixel row and the corresponding column of the pixel array.

One or more transmitter electrodes are formed proximate to the upper surface of the first substrate for transmitting a varying amplitude electrical signal. In one embodiment, the transmitter electrode is laterally spaced apart from the pixel array, and preferably extends substantially entirely around the perimeter of the pixel array. A cover layer overlies the upper surface of the first substrate for receiving a fingertip of a user; if desired, the cover layer may be integrally formed with the first substrate. The varying amplitude electrical signal transmitted by the transmitter electrode is coupled into a finger of a user who places his or her fingertip over the cover layer, and wherein the electrical signal coupled into the user's finger is further coupled through the capacitive plates in the pixel array to a greater or lesser extent, depending upon whether a ridge or valley of the user's fingertip overlies a particular pixel in the pixel array.

According to another embodiment of the present invention, multiple transmitter electrodes are located within the borders of the pixel array, preferably interspersed between successive pixel rows. Selectively-enabled transmission electrodes transmit a carrier signal for transmission into the user's finger. Transmission electrodes neighboring upon a selected row of the pixel array are disabled, while transmission electrodes more distant from the selected row of the pixel array are enabled, and transmit the desired carrier signal. This allows for effective transmission of the carrier signal into the user's fingertip, without any significant direct coupling of the carrier signal to the pixels within the currently selected row. Each time a new row is selected, the enabling and disabling of the transmission electrodes is updated to ensure that the transmission electrodes neighboring the selected row are disabled, and that the more distant transmission electrodes are actively transmitting the carrier signal.

In accordance with an alternate embodiment of the present invention, the fingerprint sensor is incorporated within a touchpad, wherein the touchpad includes a substrate. An array of sensor pixels are formed in the substrate and arranged along intersecting rows and columns for sensing the presence and location of a finger, stylus, or other "pointer" applied proximate to the upper surface of the substrate. Adjacent sensor pixels are spaced apart from each other by a first predetermined distance, corresponding to a first pitch. Each sensor pixel provides a signal indicating whether a pointer is being applied proximate to such sensor pixel.

The touchpad includes a series of row address lines supported by the substrate. Each row address line is associated with a row of sensor pixels in the array to selectively enable and address the sensor pixels in such row. The touchpad also includes a series of column sensing lines supported by the substrate. Each column sensing line is associated with a column of sensor pixels for sensing a signal provided by a sensor pixel in the row of sensor pixels selected by an enabled row address line.

A fingerprint sensor area is formed upon the touchpad substrate. The fingerprint sensor area includes a series of finer-pitch pixels arranged along intersecting rows and columns to form an array of finer-pitch pixels. Each finer-pitch pixel includes a switching device and a capacitive plate. Each finer-pitch pixel is spaced apart from adjacent finer-pitch pixels by a second predetermined distance, the second predetermined distance being less than one-third the first predetermined distance that separates the sensor pixels of the touchpad.

In order to detect the image of the user's fingerprint within the fingerprint sensor area, a series of finer-pitch row address lines are provided. Each finer-pitch row address line is associated with a row of finer-pitch pixels in the finer-pitch pixel array, and each finer-pitch row address line is selectively enabled to address the finer-pitch pixels associated therewith. Likewise, a series of finer-pitch column sensing lines are provided, each finer-pitch column sensing line being associated with a column of finer-pitch pixels. The finer-pitch column sensing lines serve to sense a signal provided by the capacitive plate of a finer-pitch pixel in an enabled row of finer-pitch pixels.

The fingerprint sensor area of the touchpad is bordered by touchpad row address lines and touchpad column sensing lines. Ideally, at least one of the touchpad row address lines and/or touchpad column sensing lines that borders the fingerprint sensor area also serves as a transmitter electrode for transmitting a varying amplitude electrical signal when the fingerprint sensor area is being used to sense a user's fingerprint. The varying amplitude electrical signal transmitted by the transmitter electrode is coupled into a finger of a user who places his or her fingertip over the fingerprint sensor area. The electrical signal coupled into the user's finger is further coupled through the capacitive plates in the finer-pitch pixel array to a greater or lesser extent, depending upon whether a ridge or valley of the user's fingertip overlies a particular pixel in the finer-pitch pixel array.

In yet another embodiment of the present invention, the aforementioned fingerprint sensor area can mimic the operation of the touchpad sensors during those times when a fingerprint image is not required. As before, the touchpad includes an array of sensor pixels arranged along intersecting rows and columns, and spaced apart from each other by a first predetermined distance. The touch pad also includes a series of row address lines, each row address line being associated with a row of sensor pixels in the array. Each row address line is selectively enabled to address the sensor pixels associated with each such row. The touchpad further includes a series of column sensing lines, each column sensing line being associated with a column of sensor pixels to sense the signal provided by a sensor pixel in the addressed row of sensor pixels.

As before, the touchpad includes a fingerprint sensor area having an array of finer-pitch pixels arranged along intersecting rows and columns. Each such finer-pitch pixel includes a switching device and a capacitive plate. Each finer-pitch pixel is spaced apart from adjacent finer-pitch pixels by a second predetermined distance, the second predetermined distance being less than one-third the first predetermined distance that separates the sensor pixels of the touchpad.

Just as in the case of the previously-described embodiment, a series of finer-pitch row address lines are provided. Each finer-pitch row address line is associated with a row of finer-pitch pixels in the finer-pitch pixel array, and each finer-pitch row address line is selectively enabled to address the finer-pitch pixels associated therewith. Likewise, a series of finer-pitch column sensing lines are provided, each finer-pitch column sensing line being associated with a column of finer-pitch pixels. The finer-pitch column sensing lines serve to sense a signal provided by the capacitive plate of a finer-pitch pixel in an enabled row of finer-pitch pixels.

A control circuit, responsive to a mode signal, is also provided for determining whether the finer-pitch pixels are to function as fingerprint sensing pixels or conventional sensor pixels of the touchpad. The control circuit individually enables the finer-pitch pixels in each finer-pitch row. When functioning as a fingerprint sensor, the signal provided by each finer-pitch pixel is individually sensed. On the other hand, when the mode signal indicates that the finer-pitch pixels are to function as conventional sensor pixels of the touchpad, the control circuit simultaneously enables the finer-pitch pixels in a multitude of adjacent finer-pitch rows, and collectively senses the signals provided by the finer-pitch pixels in the simultaneously enabled finer-pitch rows to simulate, or mimic, the operation of a conventional sensor pixel of the touchpad.

Another aspect of the present invention relates to a fingerprint sensor including a demultiplexer for reducing the number of conductors that must extend between the pixel array and a related integrated circuit. In this regard, the fingerprint sensor includes a first substrate, which may be rigid or relatively flexible, having formed therein a two-dimensional array of pixels arranged in R rows and N columns. Each of such pixels includes a switching device (e.g., a TFT), which is preferably a thin film transistor, and a capacitive plate. A series of R row addressing electrodes extend across the pixel array, each row addressing electrode being coupled to switching devices in a corresponding row of the pixel array for selectively enabling the switching devices in such row. Likewise, a series of N data electrodes are provided, each data electrode being coupled to the switching devices of the pixels in a corresponding column of the pixel array. Each data electrode senses a signal provided by the capacitive plate of the pixel located at an intersection of a selected pixel row and the corresponding column of the pixel array. A cover layer overlies the first substrate for receiving a fingertip of a user; this cover layer may be integrally formed with the first substrate, if desired.

The fingerprint sensor of this embodiment of the invention also includes a second substrate different from the first substrate, and including semiconductive material to form an integrated circuit. The integrated circuit generates a set of S row addressing signals to address one of the R row addressing electrodes. A demultiplexer is coupled between the integrated circuit and the pixel array. The demultiplexer includes at least S input terminals for receiving the first set of S row addressing signals provided by the integrated circuit, and includes at least R output terminals. Each of the R output terminals of the demultiplexer is coupled to one of the R row addressing electrodes. The demultiplexer selects one of the R row addressing electrodes based upon the S row addressing signals received thereby. The integrated circuit is also selectively coupled to the N data electrodes to receive the signals provided by the capacitive plates in the pixel array. Preferably, the demultiplexer is configured from a series of switching devices similar to those provided within the pixel array. The switching devices used to form the demultiplexer may be thin-film-transistors formed upon the first substrate.

Apart from incorporating a row-address demultiplexer, the fingerprint sensor described above may also include a multiplexer coupled between the integrated circuit and the column electrodes of the pixel array. In this regard, the integrated circuit generates a set of M column selection signals to address one of the plurality of N data electrodes. The multiplexer includes a first set of N input terminals each being coupled to a respective one of the N data electrodes to receive the signals provided by the capacitive plates in the pixel array. The multiplexer also includes a second set of M input terminals for receiving the M column selection signals provided by the integrated circuit. Based upon the status of the M column selection signals, the multiplexer selects at least one of the N data electrodes to detect the signal provided by the capacitive plate located at the intersection of the selected row and column of the pixel array. Preferably, the multiplexer also includes an output terminal coupled to the integrated circuit for providing a selected data signal thereto. As in the case of the row-address demultiplexer described above, the column electrode multiplexer may be configured from switching devices (e.g., thin-film-transistors) formed upon the first substrate.

Ideally, the fingerprint sensor having a row-address demultiplexer, as described above, also includes at least one transmitter electrode supported by the first substrate for transmitting a signal of predetermined frequency and amplitude proximate to the pixel array. The transmitted signal passes through the cover layer overlying the pixel array and into the fingertip of the user for being coupled to the capacitive plates of the pixel array through the ridges and valleys of the user's fingertip. As already noted above, the transmitter electrode may take the form of a ring encircling the periphery of the pixel array.

Yet another aspect of the present invention regards a fingerprint sensor wherein signals that are capacitively coupled from the user's finger into the pixel array are sensed in a differential manner to help block noise signals. As in the preferred embodiments described above, the fingerprint sensor includes a first substrate having a two-dimensional array of pixels arranged in R rows and N columns. Each such pixel includes a switching device (e.g., a TFT) and a capacitive plate. Once again, a series of R row addressing electrodes are provided, each row addressing electrode being coupled to switching devices within a row of the pixel array for selectively enabling the switching devices in the corresponding pixel row. Similarly, N data electrodes are provided, each data electrode being coupled to switching devices in a corresponding column of the pixel array for sensing a signal provided by the capacitive plate of the pixel located at an intersection of a selected pixel row and the corresponding column of the pixel array. A cover layer overlies the first substrate for receiving a fingertip of a user.

In one instance, a common electrode is provided. The common electrode extends at least partially through the pixel array formed on the first substrate. A series of differential amplifiers are provided for differentially sensing signals being passed by the capacitive plates of the pixel array. Each differential amplifier has a first input coupled to one of the data electrodes, and a second input coupled to the common electrode. In addition, each differential amplifier has an output terminal for providing an output signal representative of the difference between a signal provided by a data electrode and a signal provided by the common electrode.

In a second instance, a separate common electrode is omitted, and one of the data electrodes serves double-duty as a reference electrode. Each differential amplifier has a first input coupled to one of the data electrodes, and a second input coupled to the reference electrode. Each differential amplifier has an output terminal for providing an output signal representative of the difference between the data signal provided by its corresponding data electrode and a signal provided by the reference electrode.

Whether the differential-type fingerprint sensor uses a common electrode or a reference electrode, it preferably includes a second substrate of semiconductive material. This second substrate is different from the first substrate, and an integrated circuit is preferably formed within the second substrate to provide control logic.

As noted above, the preferred form of fingerprint sensor includes a transmitter electrode with one or more metal traces for transmission of a high frequency signal. The transmitter may be a single trace or several traces in a variety of patterns, including, but not being limited to, a ring; however, the traces being used to transmit such signal, at any given point in time, are preferably laterally spaced from capacitive plates within the pixel array that are being sensed at the same point in time, to avoid direct signal coupling from the transmitter electrode to the capacitive plate being sensed. The transmitter electrode is used to radiate a signal which is sent into the body of the finger. Thus, the location of the transmitter electrode is preferably close enough to the finger to allow for the signal to penetrate the finger, but far enough away from the active capacitive plates in the pixel array to prevent unwanted receptions that do not travel through the finger. While such unwanted receptions can, at least in theory, be calibrated-out by first transmitting the high frequency signal with no finger present, and recording the baseline reception energy, imaging of the fingerprint is simpler, and more accurate, if such unwanted receptions are avoided in the first instance. Because the signal is broadcast into the entire finger, and the resulting transmission energy is sent through the entire finger to the receiver array, the signal stays relatively focused as it leaves the ridges and valley of the finger and travels through the relatively thick cover plate material and onto the capacitive plates of the pixel array.

The transmitter electrode may be formed using any metal layer already available in the fingerprint sensor area, or it may be an added layer or component. The transmitter electrode may be part of a liquid crystal display (LCD), or external to it. The amplitude and frequency of the signal being broadcast by the transmitter electrode can be varied to best suit a particular environment. The transmitter drive circuitry can be located within the IC or external to the IC.

As noted above, a fingerprint sensor of the type described above may, if desired, be incorporated within a touch-sensitive LCD panel, or on a flexible plastic substrate, using standard TFT technology, wherein the TFTs are placed in a two-dimensional arrayed formation. The TFT/capacitive plate array is used to initially acquire signals transmitted from the user's fingertip, and these signals are then passed on to a separate IC chip for processing to form an image of the user's fingerprint. The pixel array may be provided in various sizes and configurations, including, but not limited to, round, square, and rectangular.

Another aspect of the present invention relates to a method of operating a touch pad to create a fingerprint sensor for sensing a user's fingerprint at substantially any location of the touch pad. In this regard, a substrate is provided, the substrate having an upper surface. An array of finer-pitch pixels are formed upon the substrate and arranged along intersecting rows and columns. Each such finer-pitch pixel includes a switching device and a capacitive plate, and each finer-pitch pixel is spaced apart from adjacent finer-pitch pixels by a first predetermined distance. A series of finer-pitch row address lines are provided to address the rows of finer-pitch pixels, each finer-pitch row address line being associated with a row of finer-pitch pixels in the array. Each finer-pitch row address line may be used to selectively address the finer-pitch pixels associated with each such finer-pitch row address line. A series of finer-pitch column sensing lines are also provided, each finer-pitch column sensing line being associated with a column of finer-pitch pixels for sensing a signal provided by the capacitive plate of a finer-pitch pixel in an enabled row of the array of finer-pitch pixels.

The aforementioned method further includes the step of sub-dividing the finer pitch pixels into a smaller array of "touch pad pixels". The array of touch pad pixels is "smaller" in the sense that it has fewer rows and fewer columns, though it occupies the same two-dimensional space. The smaller array of touch pad pixels is also arranged in rows and columns. Each touch pad pixel includes finer-pitch pixels located in at least two different rows of the finer-pitch pixels, and also includes finer-pitch pixels located in at least two different columns of the finer pitch pixels. Each such "touch pad pixel" is spaced apart from an adjacent touch pad pixel by a second predetermined distance that is at least twice as large as the first predetermined distance.

In a first mode of operation, the aforementioned method includes the step of simultaneously enabling those finer-pitch pixels that are sub-divided into a common touch pad pixel for collective operation, and collectively sensing signals provided by the capacitive plates of the finer-pitch pixels grouped within the same touch pad pixel. In this manner, each such touch pad pixel functions like a conventional sensor pixel in a typical touch pad. Using the sensed signals provided by the touch pad pixels, a detection step is performed to detect whether a pointer (e.g., a user's fingertip) is being applied to the upper surface of the substrate; if that is the case, the approximate location where such pointer is being applied, relative to the substrate, is also detected.

In a second mode of operation corresponding to fingerprint sensing, the method includes the step of determining which touch pad pixels lie near the detected pointer location. The finer-pitch pixels within each of the touch pad pixels that lie near the pointer location are selectively switched from collective operation to an individual operation mode. During the individual operation mode, the finer-pitch pixels in each finer-pitch row are individually enabled rather than being simultaneously enabled, and the signals provided by the capacitive plate of each finer-pitch pixel are individually sensed as each finer-pitch row is enabled by a corresponding finer-pitch row address line. In this manner, the finer-pitch pixels within the touch pad pixels that lie near the pointer location form a fingerprint sensor area for sensing a fingerprint image of a user's fingertip.

BRIEF DESCRIPTION OF THE DRAWINGS

FIG. 3b is a larger, partial view of the structure shown in FIG. 3a.

FIG. 20b is a side view of the fingerprint sensor button shown in FIG. 20a.

DETAILED DESCRIPTION OF THE PREFERRED EMBODIMENTS

Figure 1A:
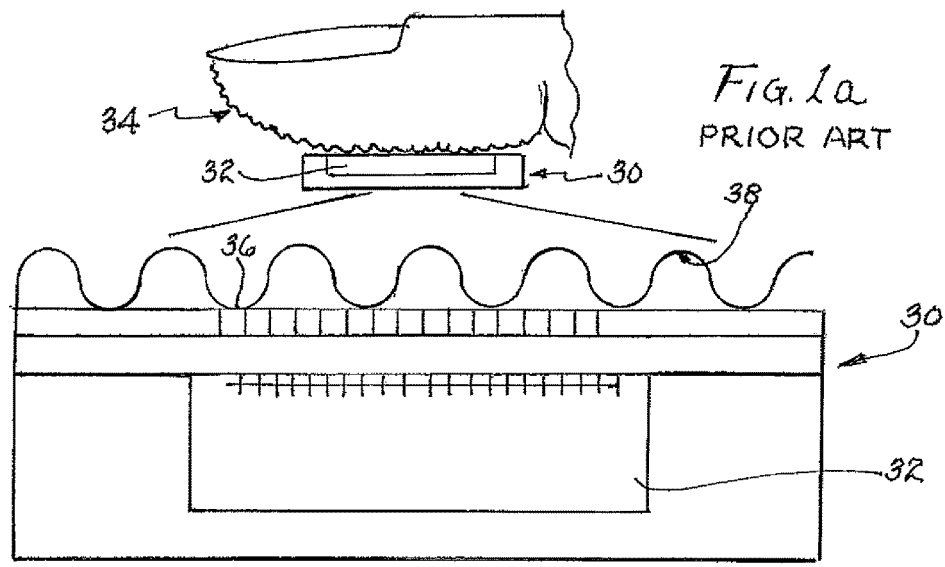
FIG. 1a is a cross-sectional diagram illustrating a first type of prior art fingerprint sensor wherein a pixel array is formed upon the surface of a silicon semiconductor chip, thus causing large silicon area to be consumed.

The following detailed description is to be read with reference to the figures, in which like elements in different figures have like reference numerals. The figures, which are not necessarily to scale, depict selected embodiments and are not intended to limit the scope of the invention.

Figure 1B:
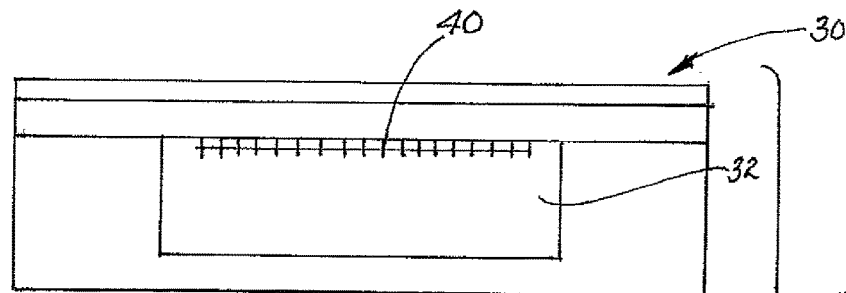
FIG. 1b is a combined cross-sectional and top view of the prior art fingerprint sensor shown in FIG. 1a, and illustrating how an increase in pixel count directly increases silicon size.
Figure 1B:
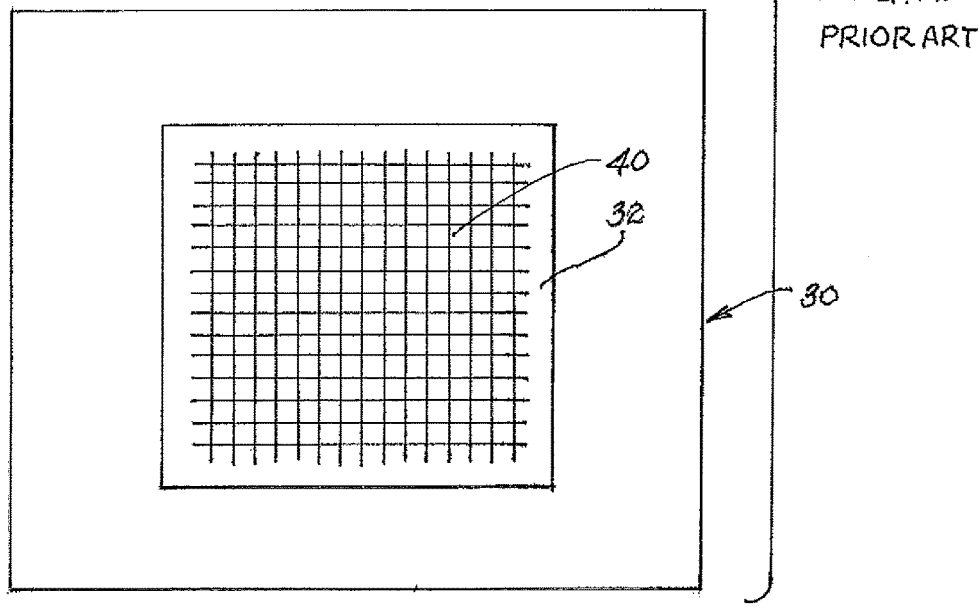

FIGS. 1a and 1b illustrate a known fingerprint sensor 30 which utilizes an entire silicon chip 32 as the receiver for signals derived from the user's fingertip 34. Various methods have been described for transmitting a signal into the user's finger, both on the silicon chip itself, and external to the silicon chip; in either case, the pixels 40 used to receive signals from the user's fingertip are directly formed on a silicon chip. The signal is received at each pixel in the silicon chip. Signal detection may be based upon voltage amplitude, signal phase shift, or other methods for detecting differences between signals that pass through a ridge 36 of the fingertip versus signals that pass through a valley 38 of fingertip 34. The primary disadvantage posed by this approach is the cost, due to the size and complexity required for silicon chip 32. Since the receiver pixels 40 are located in silicon chip 32 itself, a relatively large silicon area is consumed, and any increase in pixel count directly increases the required size of the silicon chip. As the size of silicon chip 32 increases, the likelihood of defects also increases; in some cases, even a single defect will render the entire silicon chip 32 useless. In addition, this approach suffers from a lack of flexibility in packaging methods, due to the need to protect the surface of silicon chip 32, which is similar to fragile glass.

Figure 2A:
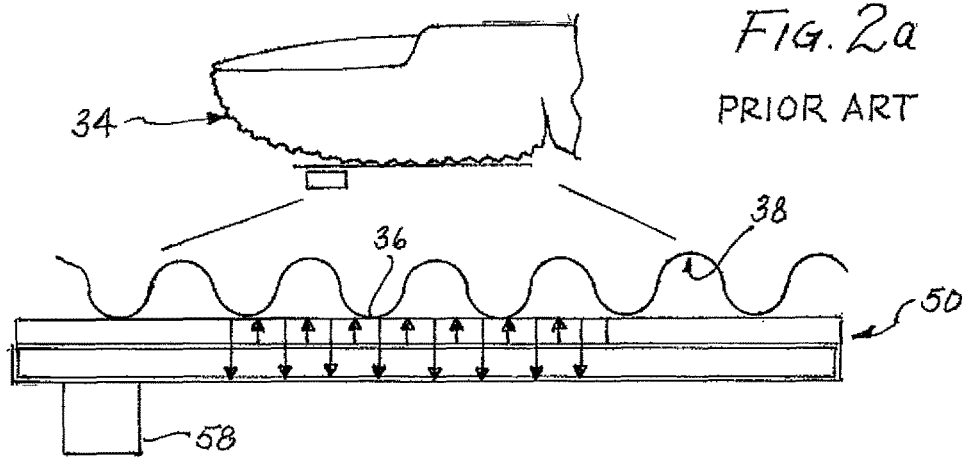
FIG. 2a is a cross-sectional diagram illustrating another type of prior art fingerprint sensor wherein signal transmission electrodes and signal receiving plates are formed by narrow metal traces located closely proximate to each other.
Figure 2B:
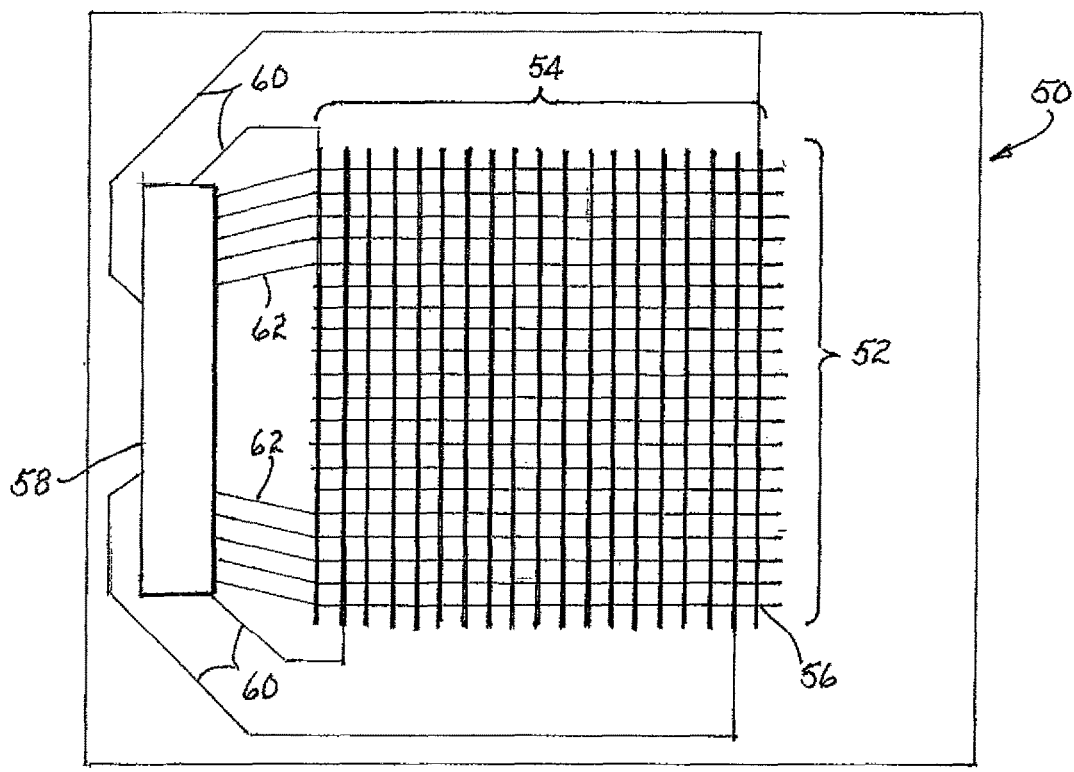
FIG. 2b is a top view of the prior art fingerprint sensor shown in FIG. 2a, and illustrates how the use of a an integrated circuit separate from the pixel array requires a large number of interconnecting metal traces between the IC and the pixel array, which metal traces themselves consume a relatively large area.

FIGS. 2a and 2b illustrate another known fingerprint sensor 50 wherein an array of metal lines are arranged in an array of X rows 52 by Y columns 54. The series of X row lines 52 serve as receiver traces ("Rx"), and the series of Y column lines 54 serve as transmitter traces ("Tx"). The intersection of a Tx transmitter line and an Rx receiver line forms a single pixel area, which is designated 56 in FIG. 2b. Typically, each receiver line 52 is somewhat enlarged at each location where it intersects a transmitter line 54 to form a "receiver plate". Theoretically, a source signal travels from the TX transmitting line, up into the user's fingertip 34, and back down to the Rx receiver line, in the same location. A separate IC chip 58 is interconnected by additional metal traces 60 and 62 with the TX transmitter lines 54 and Rx receiver lines 52, respectively, for processing the image received by fingerprint sensor 50.

The known approach illustrated in FIGS. 2a and 2b suffers from severe signal-to-noise issues for multiple reasons, as will now be explained. Both the Tx transmitter lines 54 and the receiver "plates" provided at each intersection of a Tx line 54 and receiver line 52 are formed within patterned metal layers. Due to relatively tight spacing within the pixel array, each of the series of Tx lines 54 is relatively narrow, and each of the receiver plates formed on receiver lines 52 is very small. The effective width of the Tx line is limited to the spacing between adjacent pixels. Moreover, the size of each receiver plate is also limited because the Tx lines 54 and Rx lines 52 must be formed on separate metal layers (to avoid electrical shorts), and therefore neither Tx line 54 nor the receiver plates of Rx line 52 can encompass the entire pixel area; otherwise, the metal forming Tx line 54 would block the transmitted signal from reaching a receiver plate located below Tx line 54. Alternatively, if the receiver plates were formed in an upper layer of metal, and the Tx lines 54 were formed in a lower layer of metal, then the receiver plates would block the transmitted signal from reaching the user's fingertip. As a result, this approach suffers from large signal losses, de-focusing of the transmitted signal, and thus poor image quality. In addition, IC chip 58 requires a relatively large number of I/O pads, directly related to the number of Tx transmit and Rx receive lines required. Routing of these signals between IC chip 58 and the pixel array consumes a significantly large area.

Further, the signal transmitted from Tx line 54, into fingertip 34, and back into the receiver plates formed on Rx line 52, cannot be effectively isolated to the exact pixel area where such lines intersect with each other. This is because the entire Tx line 54 is active, and the entire Rx line is being sensed, at any given point in time. This can cause unwanted signals, which can vary depending upon the image being acquired. For example, if a large finger ridge 36 is located over the entire Tx line 54, or over the entire Rx line 52, then the received signal will be different than that from a similar pixel elsewhere which only has a ridge over the exact area of that one pixel, even though it is desired to detect equal signals from both pixels. This can cause large image distortion issues, and complicate post-processing requirements to attempt to reconstruct the proper image.

Figure 3A:
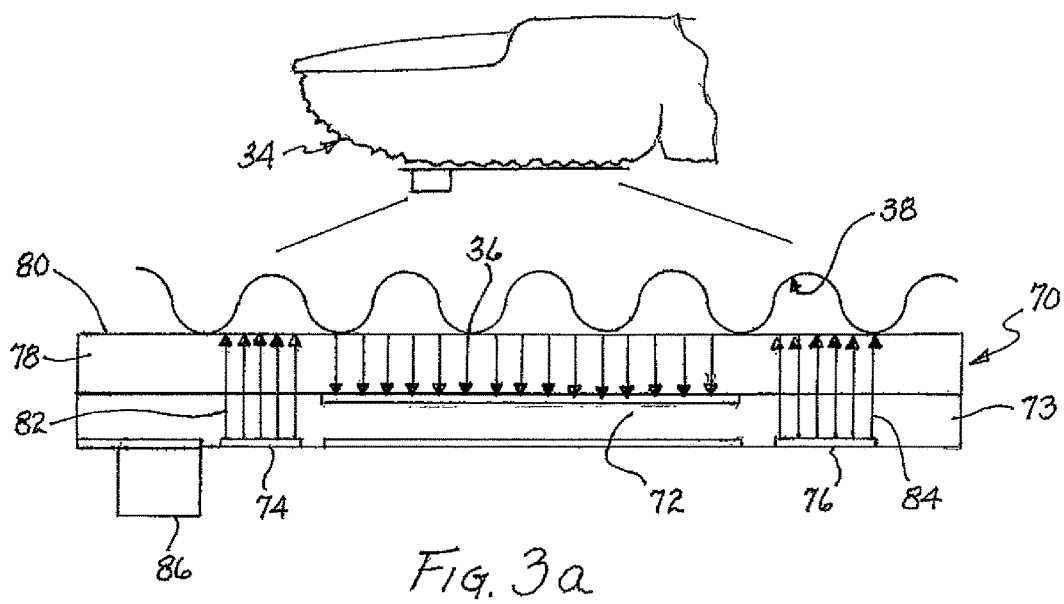
FIG. 3a is a cross-sectional diagram showing one preferred embodiment of the present invention including a transmitter electrode ring surrounding the periphery of a two-dimensional TFT/capacitive plate array formed upon a flex substrate, with a separate IC for signal processing.
Figure 3B:
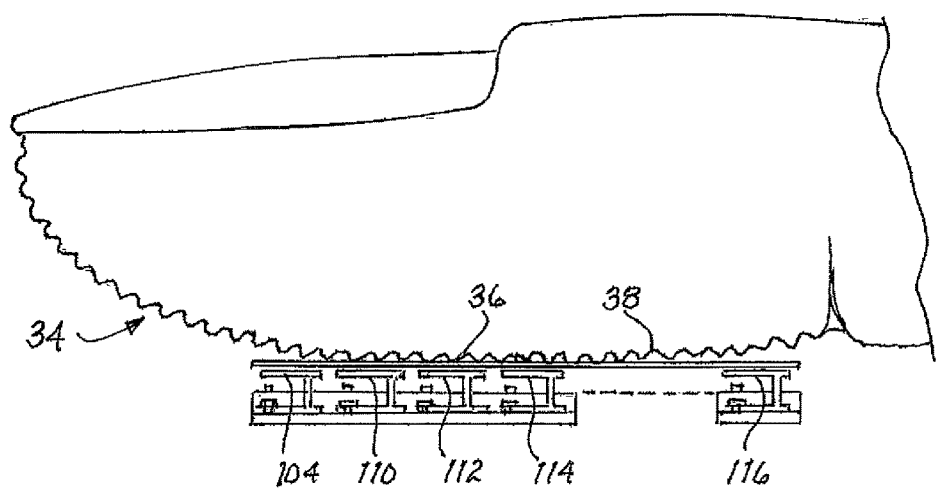

FIGS. 3a and 3b show a fingerprint sensor 70 in accordance with a first embodiment of the present invention. A pixel array 72 includes an array of thin-film transistors ("TFTs"), or similar low cost switching devices as an alternative to silicon integrated circuit devices. The—19—TFTs may be formed upon a flexible substrate 73. Pixel array 72 is shown in greater detail in FIGS. 3b, 4a, 4b, 4c and 5 described below. Each pixel of the array includes one TFT device. In addition, a relatively large metal capacitor, or more accurately, "capacitive plate", is formed at each pixel within the array. A protective dielectric layer 78 is formed above the pixel array 72, and includes an uppermost surface 80 for receiving a user's fingertip 34. The capacitive plates are formed within flexible substrate 73, below dielectric layer 78, but as near to the user's fingertip as possible (generally near the uppermost surface upon which a user places his or her fingertip). Relatively wide Tx transmission traces 74 and 76 are shown in FIG. 3a extending along both sides of pixel array 72 to transmit a high frequency signal from fingerprint sensor 70 into the user's fingertip 34, as indicated by arrows 82 and 84, respectively. As will be explained in greater detail below, Tx transmission traces 74 and 76 may actually be portions of a single Tx transmission ring that encircles pixel array 72. Transmitter traces 74 and 76 may be formed upon the lowermost surface of flexible substrate 73. A separate integrated circuit silicon chip 86 is bonded to the lowermost surface of flexible substrate 73, and conductive traces extend along and/or through flexible substrate 73 to interconnect IC chip 86 and pixel array 72. While a flexible substrate 73 is illustrated, the described structure can also be easily fabricated on glass or other more rigid substrates, as desired.

Figure 4A:
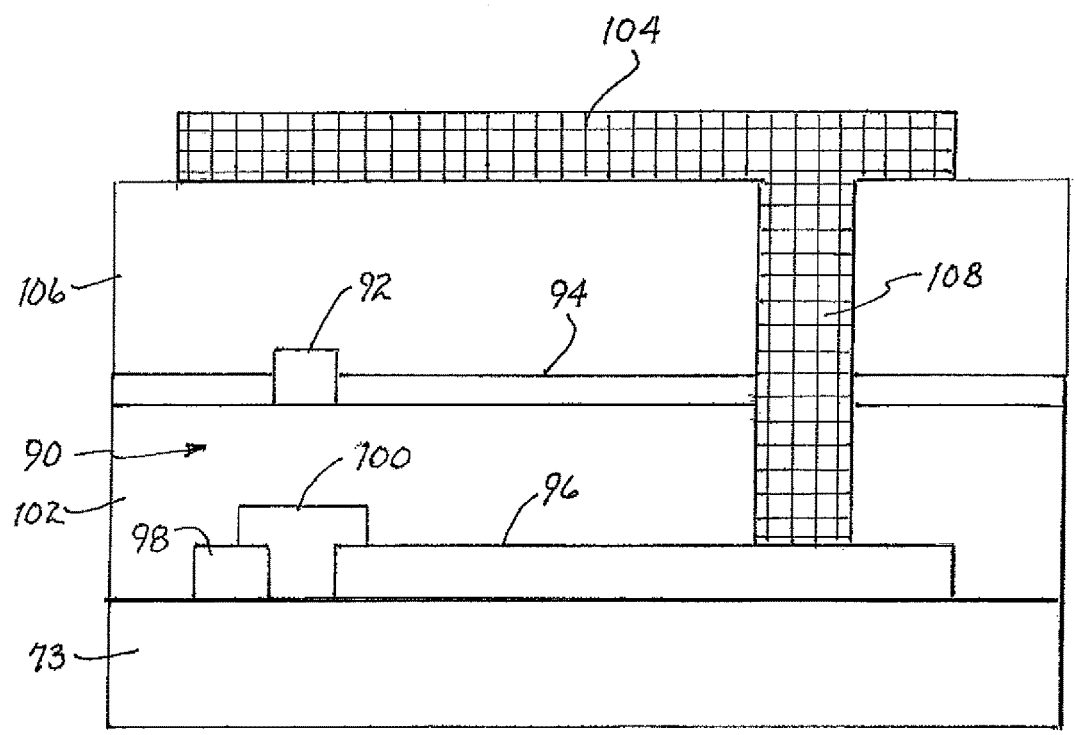
FIG. 4a is a cross-sectional diagram illustrating one of the TFT/capacitive plate pixels within the pixel array.
Figure 5:
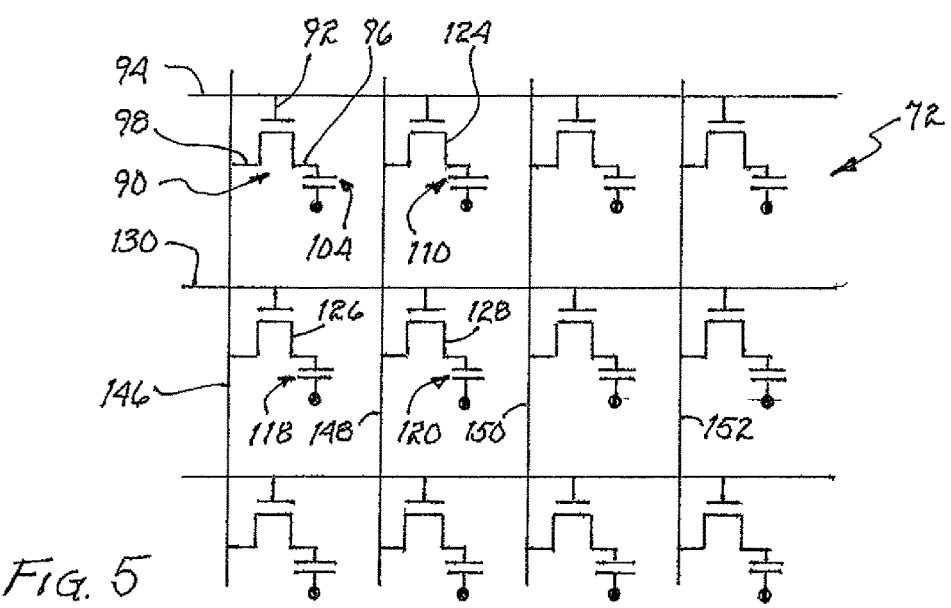
FIG. 5 is an electrical schematic diagram of three rows, and four columns, of the fingerprint sensor pixel array.

As shown best in FIGS. 4a and 5, each TFT 90 has a gate electrode 92 coupled to a row address line 94. FIG. 5 is a schematic of the first three rows, and first four columns, of the pixel array 72. In FIG. 5, TFT 90 is located in the first row of the pixel array, and its gate electrode 92 is coupled to row address line 94 for the first row ("Row 1") of pixel array 72. As indicated in FIG. 5, each row of pixel array 72 (i.e., Row 1, Row 2, Row 3, . . . ) can be individually addressed, one at a time. This is accommodated by having a TFT (e.g. 90) at each pixel location within pixel array 72. Apart from gate electrode 92, TFT 90 also includes a drain electrode 96 and a source electrode 98, separated from each other by a semiconductor region 100. In addition, gate electrode 92 is spaced apart from semiconductor region 100, and from drain electrode 96 and a source electrode 98, by a gate dielectric layer 102. When the row line 94 to which gate electrode 92 is coupled is selected, gate 92 renders semiconductor region 100 conductive, and drain electrode 96 and source electrode 98 are electrically coupled to each other. On the other hand, when row line 94 is not selected, semiconductor region 100 electrically isolates drain electrode 96 and source electrode 98. The aforementioned construction of TFT 90 is entirely consistent with known methods currently used to produce TFTs on flexible substrates.

Still referring to FIGS. 4a and 5, a pixel electrode, or capacitive plate, 104 is formed above TFT 90. Pixel electrode 104 extends substantially parallel to flexible substrate 73, and parallel to the surface against which the user will ultimately press his or her fingertip against. Pixel electrode 104 is supported upon the uppermost surface of an interlayer dielectric layer 106, which electrically insulates pixel electrode 104 from gate electrode 92 and row line 94. A via 108 is formed through gate dielectric layer 102 and interlayer dielectric layer 106 to electrically couple pixel electrode 104 to drain electrode 96 of TFT 90. As shown in FIG. 3b, when fabrication of fingerprint sensor 70 is complete, the pixel electrodes 104, 110, 112, 114, and 116 of pixel array 72 lie just below the user's fingertip, separated therefrom by a protective layer. It should be noted that the source and drain lines of TFT 90 are located well below pixel electrode 104, and do not enter into significant direct capacitive coupling with the user's fingertip 34, thereby lessening any introduction of stray signals through the row lines or the column lines. When fabricated as described above, the row lines are coupled to the gates of the TFTs, and the column lines are coupled to the sources of the TFTs. Each pixel electrode 104 forms a capacitor from the drain of each TFT to the user's fingertip.

Figure 4B:
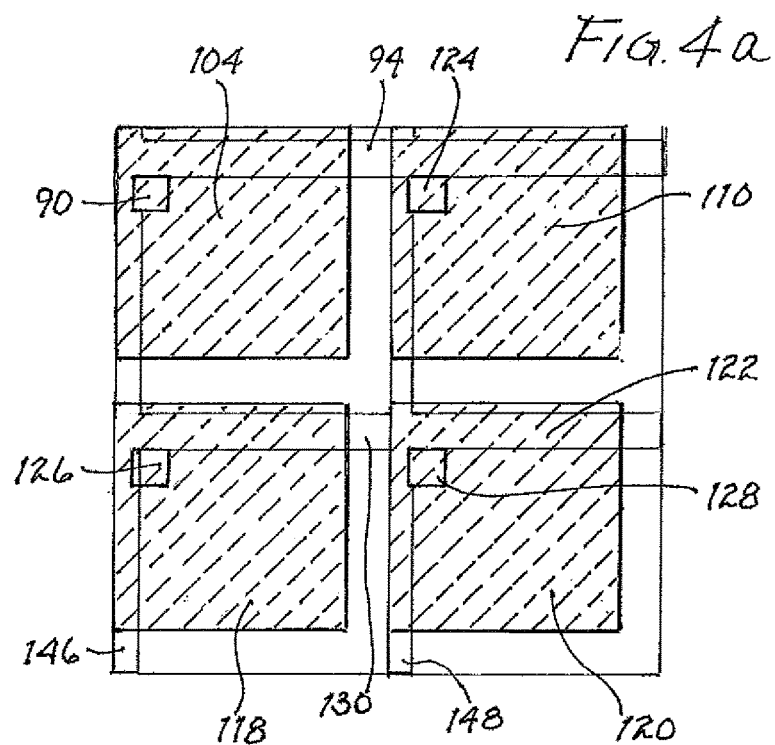
FIG. 4b is a top view of four pixels within the pixel array.

FIG. 3b illustrates pixel electrodes 104, 110, 112, 114, and 116 all lying in a common row of the pixel array. In reality, there are numerous rows of pixel electrodes. Turning briefly to the grid layout of FIG. 4b, pixel electrodes 104 and 110 lie adjacent each other in Row 1, and the gate electrodes of both TFT 90 and TFT 124 are commonly coupled to row line 94. Two additional pixel electrodes, 118 and 120, are also shown in FIG. 4b, being located in the next succeeding row. The TFTs 126 and 128 associated with pixel electrodes 118 and 120, respectively, have each of their gate electrodes coupled to row line 130, corresponding to Row 2 of the pixel array. Each pixel electrode essentially forms a capacitor along with the user's fingertip and the protective dielectric layer that electrically separates the pixel electrode from the user's fingertip. The signal transmitted into the user's fingertip is coupled through each such capacitor into pixel array 72. The plates of this effective capacitor are closer to each other when a ridge of the user's fingertip is directly above a pixel, while the plates of this effective capacitor are further from each other when a valley of the user's fingertip is directly above a pixel. Due to the variations in such capacitance from pixel to pixel, the transmitted signal coupled through the TFT of each pixel will vary accordingly, and these variations can be used to form the image of the fingerprint. In addition, by forming the large metal capacitors, or "pixel electrodes", near the top of the material stack, while placing the column lines further below, extraneous signals from other locations in the array are more effectively isolated from the data being detected by the column lines. Meanwhile, IC chip 86 can be mounted to the underside of flexible substrate 73 for driving the row lines, and processing the data signals provided by the column lines.

Figure 4C:
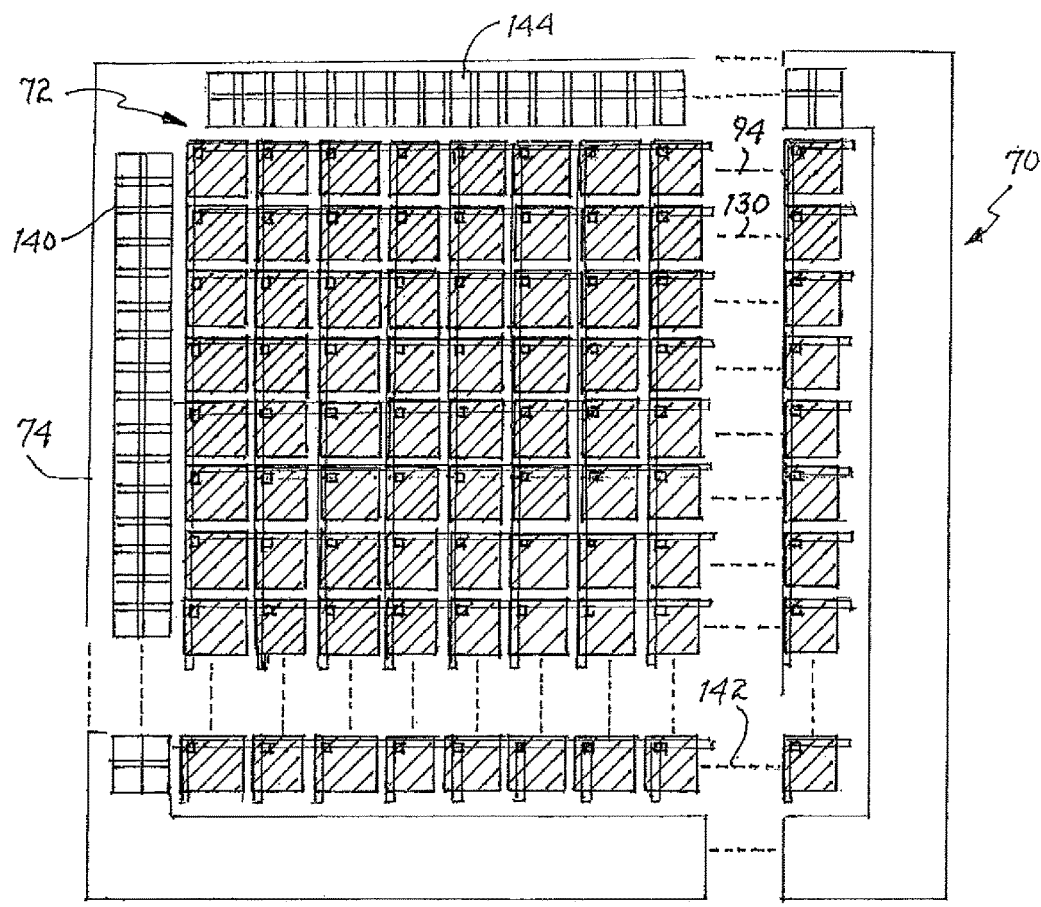
FIG. 4c is a cut-away top view of the entire pixel array further illustrating the location of the transmission electrode ring, the row-address demultiplexer, and the column decode multiplexer.

FIG. 4c is a simplified top view of fingerprint sensor 70. Pixel array 72 includes X rows and Y columns of pixels, each such pixel being fabricated in the manner described above in conjunction with FIGS. 4a, 4b and 5. Pixel array 72 is surrounded, about its periphery, by transmission ring 74' for transmitting a high-frequency signal into the user's fingertip. Transmission ring 74' lies outside the area of pixel array 72. Transmission ring 74' effectively transmits a high frequency signal into the body of the user's fingertip 34. This radiated signal is conducted by the user's fingertip, passes through the ridges and valleys of the fingertip surface, through a protective intervening material in the customer's system (e.g., a cell phone cover glass), and is received onto the capacitive metal plates, or pixel electrodes, in pixel array 72.

A demultiplexer 140 extends along one side of pixel array 72. Demultiplexer 140 receives control signals from IC 86 for indicating which of the rows in the pixel array is to be selected at a given point in time. Demultiplexer 140 decodes such control signals and drives the row lines (94, 130, . . . 142) to enable only one row at any given time. Demultiplexer 140 reduces the number of conductive traces that need to extend between IC 86 and pixel array 72. For example, if pixel array 72 includes 256 rows of pixels, then pixel array 72 includes 256 row lines. On the other hand, there need only be eight binary control lines extending between IC 86 and demultiplexer 140 in order to select one of the 256 row lines.

Referring again to FIGS. 4b and 5, a series of Y column electrodes, including column electrodes 146, 148, 150 and 152, extends through pixel array 72 to detect a signal derived from the pixel located within the corresponding column of the selected row. For example, if row 94 is selected, column electrode 146, which is coupled to the source electrode of TFT 90, senses the signal provided by pixel electrode 104; likewise, column electrode 148, which is coupled to the source electrode of TFT 124, senses the signal provided by pixel electrode 110. Thus, the gate of each TFT is connected to a corresponding row driver, the drain of each TFT is connected to the pixel electrode (which forms a capacitor with the user's fingertip), and the source terminal of each TFT is coupled to a column line, or "data line", to IC 86 for signal processing. The row lines (94, 130) and column lines (146, 148, 150 and 152) shown can be formed of any conductive metal, including indium tin oxide (ITO), which is a transparent metal used in producing LCDs. Other metals, such as aluminum or copper can also be utilized, when transparency is not required.

Returning to FIG. 4c, column decode circuit block 144 is electrically coupled to all of the column electrodes, including column electrodes 146, 148, 150 and 152 shown in FIG. 5. Column decode circuit block 144 thereby detects signal levels at each pixel in the selected row. By stepping sequentially through the X rows of the pixel array, an image of the user's fingerprint may be derived having X by Y pixels. The capacitive plates, or pixel electrodes, can receive signal energy from the user's fingertip 34 in the form of a signal amplitude, a signal phase shift, or other methods, so long as the characteristics of the detected signal are varied depending upon whether the transmitted signal passes through the ridges, or the valleys, of the user's fingertip. If desired, the characteristics (frequency, amplitude, etc.) of the transmitted Tx signal can be varied from one detection pass through the pixel array to the next, and multiple samples can be taken and averaged to produce a more accurate image.

In use, a single row driver would be turned on, activating that particular row of pixels. Transmission ring 74' is used to transmit a known signal at a predetermined frequency. The signal contents of the pixels in the selected row is transferred onto the column lines for detection, sensing, and processing within external IC chip 86. This approach allows IC chip 86 to be physically displaced from the pixel array, and allows for a reduction of row selection lines and sensed signal data lines between IC chip 86 and the pixel array through the use of demultiplexing/multiplexing schemes. Each pixel electrode (104, 110, etc) forms a capacitor with the fingertip, and the value of the capacitor will depend on the surface of the finger (ridge or valley) above each pixel location. Each pixel electrodes receives a signal from the fingertip, and if the associated TFT is "on" (i.e., the row driver for this particular row is enabled to turn on the "gate" of this TFT), then the capacitively-coupled signal will be conducted through the TFT, and presented on the "data line", or column electrode, of the pixel array.

Column decode circuit block 144 is electrically coupled to IC 86, which processes the signals detected at each pixel of the array to form the image of the fingerprint. To minimize the number of conductive traces between column decode circuit block 144 and IC chip 86, the detected signals may be transmitted from column decode circuit block 144 to IC chip 86 in blocks. For example, if pixel array 72 includes 256 columns of pixels, column decode circuit block 144 could transmit blocks of 16 signals at a time, requiring sixteen such transmissions for each row of the array. Apart from the 16 conductive traces between column decode circuit block 144 and IC chip 86 for transmitting a block of signal data, only four additional control lines might be needed to indicate which of the sixteen blocks of data is being transmitted. This multiplexing technique significantly reduces the number of metal traces that must extend between column decode circuit block 144 and IC chip 86.

Figure 6:
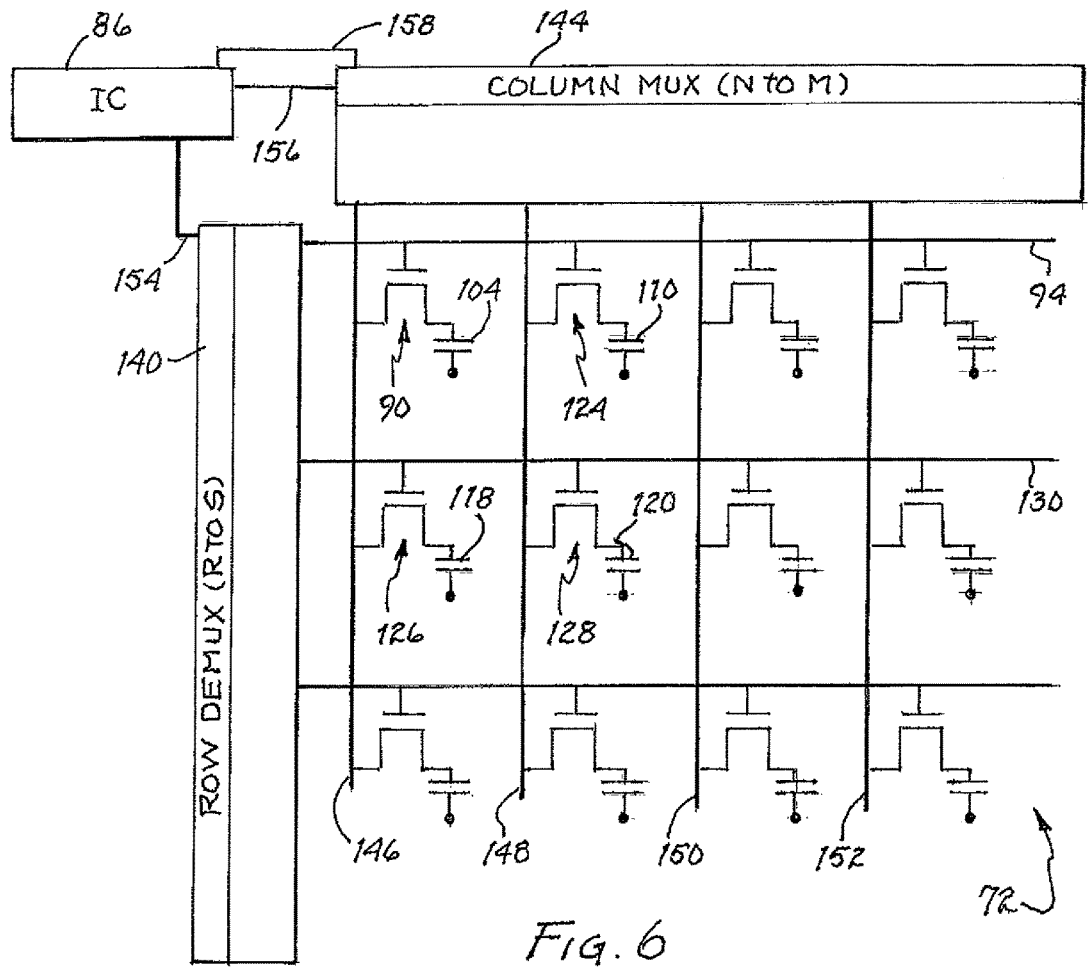
FIG. 6 is a partial schematic combining the sensing devices of FIG. 5 with the related components of the fingerprint sensor, and illustrating how the number of external signal paths to the IC are reduced.

FIG. 6 may help to illustrate further the manner in which demultiplexer 140, and column decode circuit block 144 reduce the number of conductive traces that need to extend between IC 86 and pixel array 72. Row lines 94, 130, etc., are driven by demultiplexer 140. Demultiplexer 140 has a number of output terminals equal to the number of row lines, and only one such row is selected at any given time. In contrast, the number of select lines 154 extending between IC 86 and demultiplexer 140 is exponentially reduced. Again, if there are 256 rows of pixels in the array, then select lines 154 require only eight conductive traces to uniquely identify one of the 256 rows. Thus, demultiplexer 140 can take a number (x) of select lines and address $2^x$ rows through simple digital logic. Alternatively, demultiplexer 140 may simply be a digital shift register wherein a logic "1" output signal is sequentially passed from the Row 1 output terminal, to the Row 2 output terminal, etc., enabling one row at a time until all of the rows have been enabled.

Similarly, if the pixel array were to include 256 column electrodes, including column electrodes 146, 148, 150 and 152, and if the columns are sub-divided into 16 blocks of 16 columns each, then column decode circuit block 144 can transmit each block of data over sixteen conductive traces, represented in FIG. 6 by bus 156. Four additional conductive traces, indicated in FIG. 6 by select lines 158, are sufficient to uniquely address one of the sixteen blocks of data for any given row of pixels, in this example. In the case of the column drivers, the signals will be analog, and must be de-muxed through analog muxes. As an example, it could be from $2^Y$ columns to one final analog input "M", using Y select lines. Depending upon the configuration, M could be 1 or a much larger number. This simply depends on the reduction of signals required, and the timing allowed for this process. For example, if the system chooses to address a single pixel at a time (M=1), then all X by Y pixels must be addressed individually.

Figure 7B:
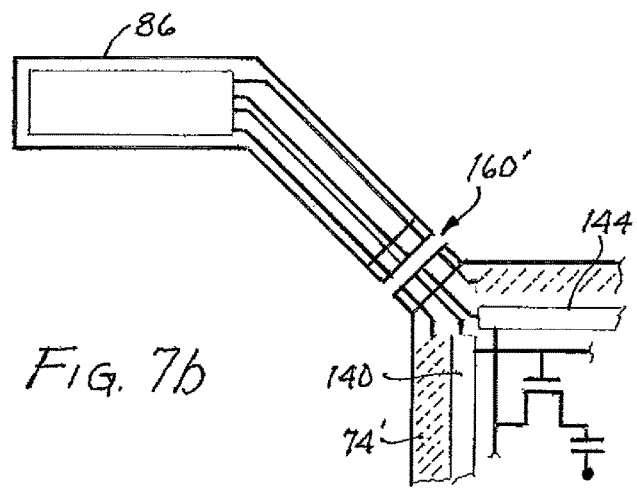
FIG. 7b is a partial top view of the upper left corner of FIG. 7a but including a detachable connector between the IC and the fingerprint sensor array.
Figure 7A:
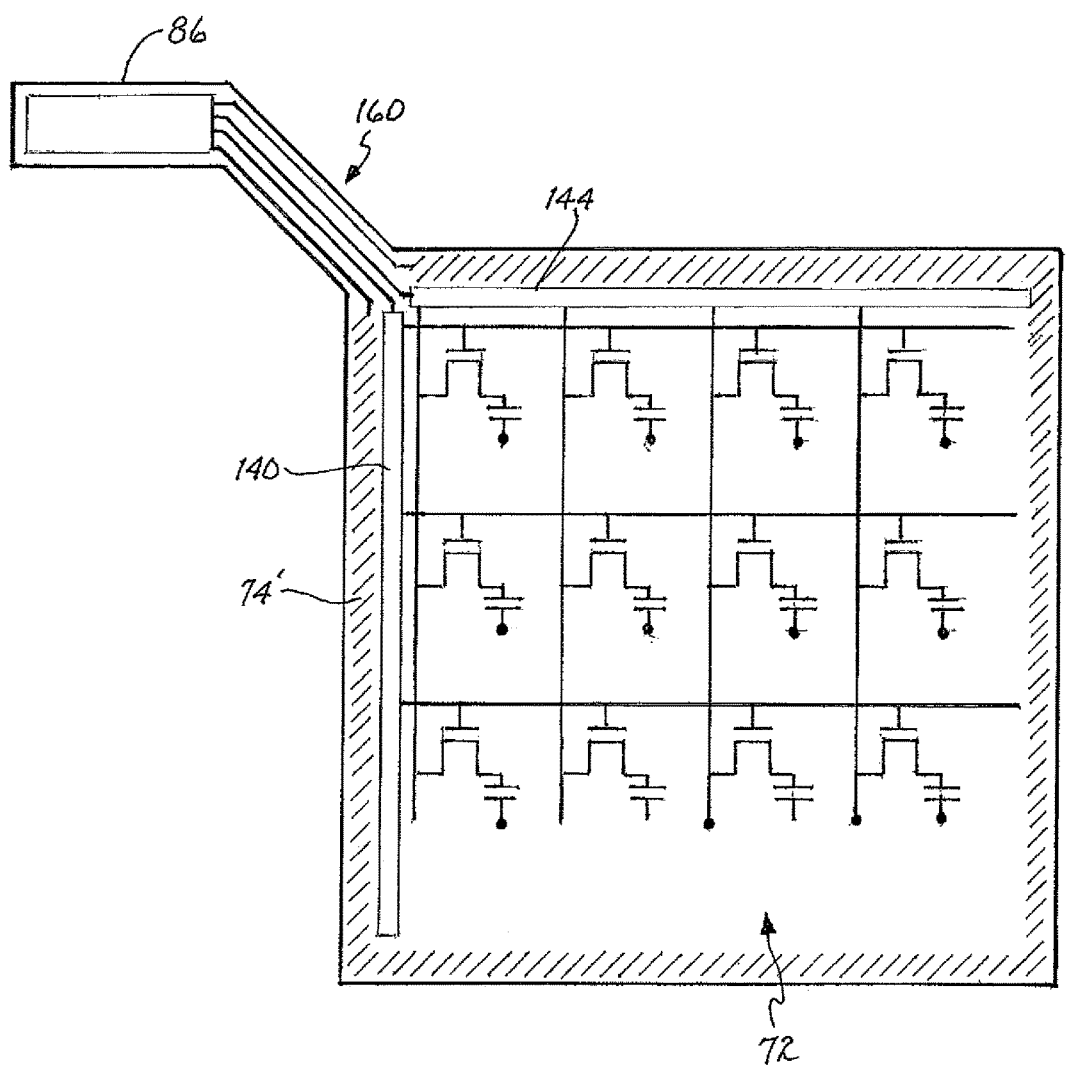
FIG. 7a is a top view of the fingerprint sensor illustrating a metal transmission ring placed around the sensor pixel array, along with metal paths between the pixel array, transmitter electrode, and IC.

FIG. 7a better illustrates the location of the Tx transmission ring 74' relative to the pixel array 72. Tx transmission ring 74' can be a simple metal structure, and could be formed either above the gate dielectric layer 102 (see FIG. 4a) or below gate dielectric layer 102. Tx transmission ring 74' can either be driven with a signal sourced by IC chip 86, or by an external driver. Tx transmission ring 74' is placed sufficiently far enough away from pixel array 72 so as to avoid direct signal injection from transmission ring 74' to the pixel electrodes; rather, the high frequency signal radiating from transmission ring 74' must first pass into the user's fingertip 34 before being coupled to the pixel electrodes. Within FIG. 7a, connector 160 extends between pixel array 72 and IC chip 86 for passing electrical signals therebetween. If desired connector 160 could be formed as a detachable connection 160' as shown in FIG. 7b.

Figure 8:
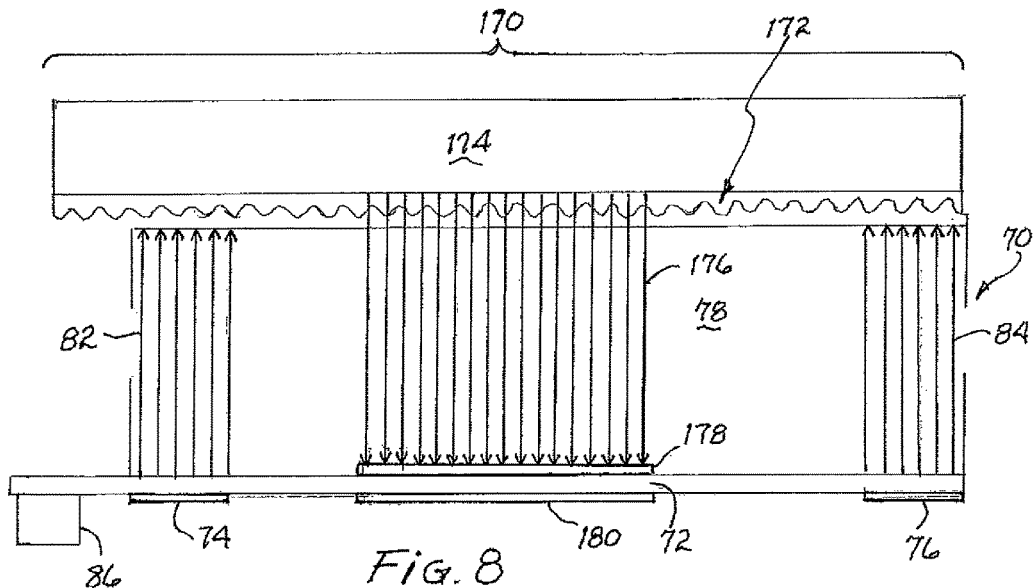
FIG. 8 is an enlarged cross-sectional diagram similar to FIG. 3a, and illustrating how the signal radiated by the transmission electrode is coupled through layers of the user's finger back to the ridges and valleys of the user's fingertip into the pixel array.

FIG. 8 is similar to FIG. 3a already described above, but better illustrates how the signal radiated by transmission electrodes 74 and 76 is coupled through layers of the user's finger back to the ridges and valleys of the user's fingertip and into the pixel array. In FIG. 8, the user's fingertip is designated generally by reference numeral 170. The external layer of the user's fingertip, which includes ridges and valleys, is designated 172. Directly above external layer 172 is an inner conductive layer of tissue 174. The high-frequency signal radiated from transmission electrodes 74 and 76 passes upwardly along arrows 82 and 84, respectively, through the protective dielectric layer 78, through external layer 172 of the user's fingertip, and into the more conductive layer of tissue 174. The signal conducted by layer 174 is radiated back downwardly toward pixel array 72, through the ridges and valleys of external layer 172, and through protective dielectric layer 78 along the path indicated by arrows 176, for reception by the pixel electrodes (designated 178 in FIG. 8). Within FIG. 8, the metal layer 180 disposed below pixel array 72 represents, for example, the routing of the row address lines used to select the active row in the pixel array. Once again, IC chip 86 may be mounted to the underside of the substrate supporting pixel array 72.

Figure 9:
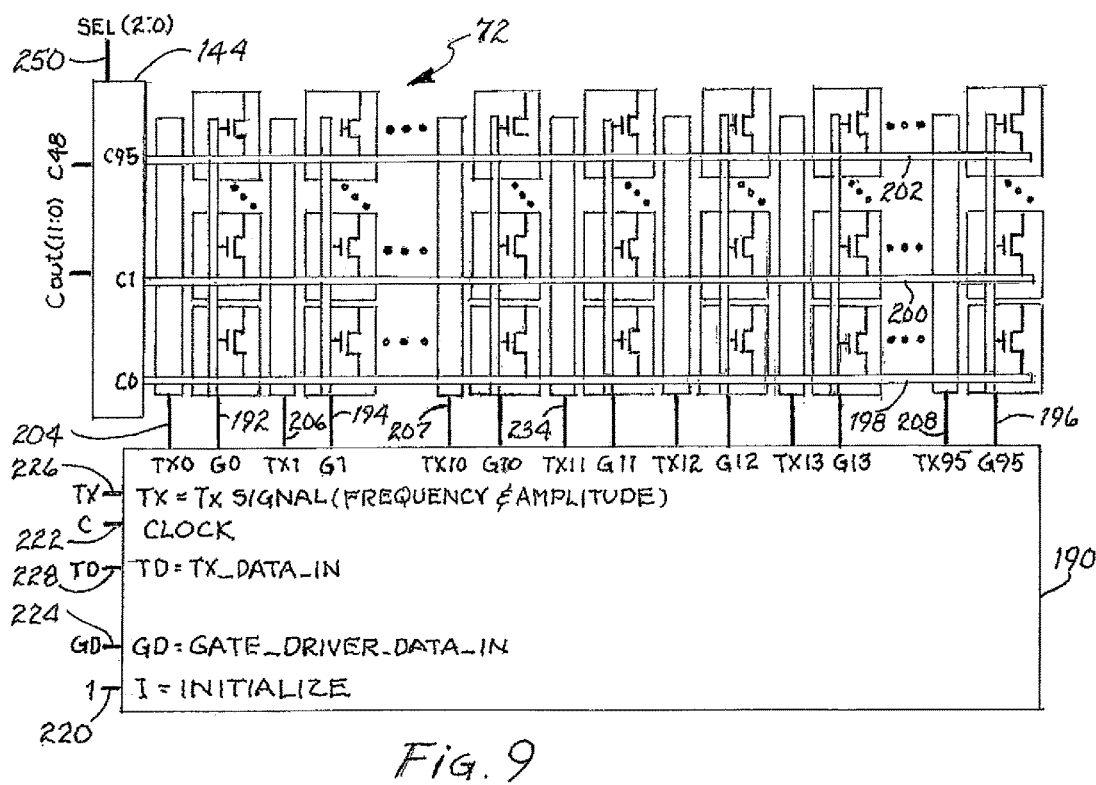
FIG. 9 is a block diagram illustrating an alternate embodiment of the invention wherein transmission electrodes are interspaced between row addressing electrodes of the pixel array.

Within FIG. 9, an alternate embodiment of the invention is illustrated in block diagram form wherein transmission electrodes are interspersed between row addressing electrodes of the pixel array. In this example, the pixel array 72 is a matrix of 96 rows and 96 columns. As in the previously described embodiment, pixel array 72 is formed by a matrix of pixel cells, each pixel cell including a TFT and a pixel electrode. In FIG. 9, block 190 represents the logic used to address the row lines 192 (row G0), 194 (row G1), through 196 (row G95). Row line 192 (G0) is coupled to the gate electrodes of the TFTs lying in a common first row (note that, in FIG. 9, the array has been turned ninety degrees, and the rows actually extend up and down the page). Likewise, row line 194 (G1) is coupled to the gate electrodes of the TFTs lying in a common second row. Row line 196 (G95) is coupled to the gate electrodes of the TFTs lying in a common last row of pixel array 72.

As in the case of the previously described embodiment, the column, or data, electrodes, including lines 198 (C0), 200 (C1), through 202 (C95), are coupled to the source terminals of the TFTs lying along a common column in order to sense the signal received by the pixel electrode in the addressed row of pixels. Column electrode lines 198 (C0), 200 (C1), through 202 (C95) are each coupled to column decode circuit block 144 for detecting the signals received by each pixel electrode within the selected row of pixels.

Within the embodiment shown in FIG. 9, there are also a series of transmission electrodes, including TX0 line 204, TX1 line, . . . , TX10 line 206, through TX95 line 208, which also extend from TFT row logic block 190, and which extend in alternating fashion between the row addressing lines 192 (row G0), 194 (row G1), through 196 (row G95). These TX lines can be used, in lieu of the transmission ring 74' shown in FIG. 7a, to transmit the high-frequency signal into the user's fingertip. At first, this might seem to contradict Applicants' objective of keeping the transmission electrodes laterally spaced apart from the pixel array to prevent direct capacitive coupling from the transmission electrodes to the pixel electrodes (i.e., bypassing the user's fingertip). However, by judiciously selecting which ones of the transmission electrodes are active at any given time, and by keeping the active transmission electrodes away from the selected row of the pixel array, one can largely avoid the problem direct capacitive coupling from the transmission electrodes to the pixel electrode. In addition, by placing the transmission electrodes within the pixel array, rather than around it, one avoids the need to dedicate extra area on the substrate for a transmission electrode that encircles the perimeter of the pixel array.

Figure 10:
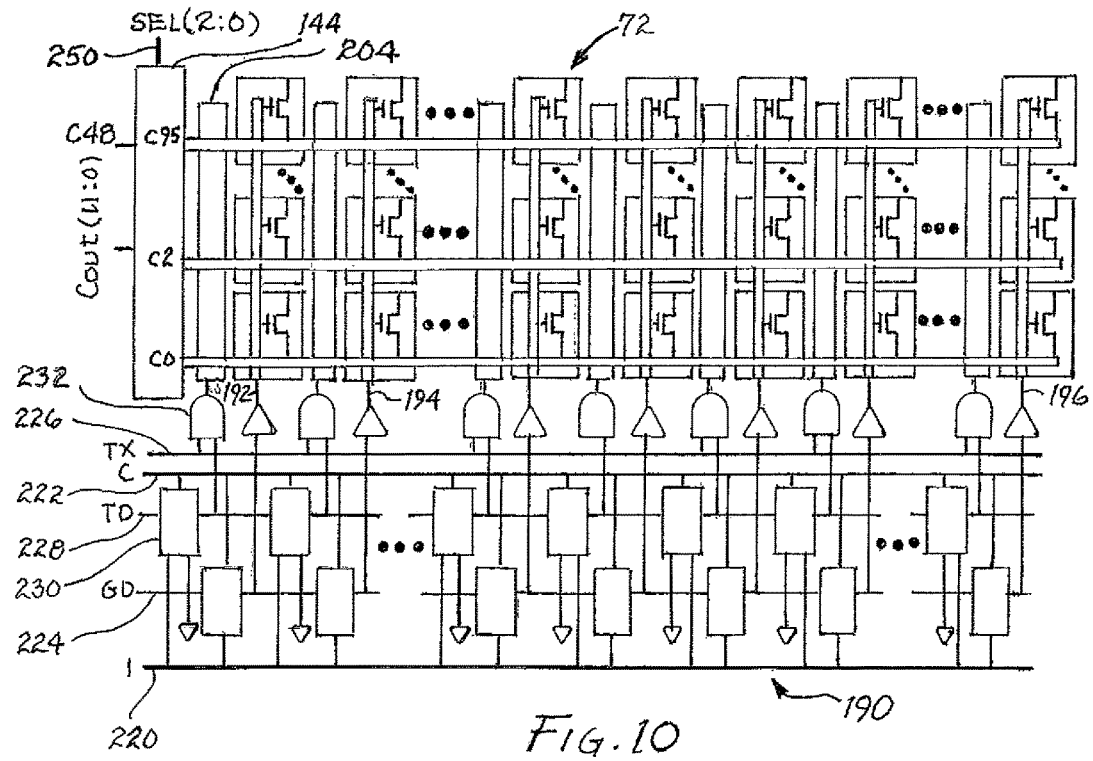
FIG. 10 is a more detailed block diagram, similar to FIG. 9, but further illustrating a demultiplexing technique for driving the row addressing electrodes.

FIG. 10 is a higher level functional diagram of logic components formed within TFT row logic block 190 for creating the driving signals used to control row addressing lines 192 (row G0), 194 (row G1), through 196 (row G95), and TX0 line 204, TX1 line 206, . . . , TX10 line 207, through TX95 line 208. The operation of the TFT row logic block 190 will be better understood by reference to the timing waveforms shown in FIG. 12. IC chip 86 sends an initiation signal 220 to TFT row logic block 190 to commence a read cycle of the pixel array 72, and clears/resets logic elements. Pulsed clock signal 222 is also provided by IC chip 86 to TFT row logic block 190 to provide a timing reference. IC chip 86 also sends a pulse GD on line 224 to indicate that the sequence of enabling the row addressing lines is to begin. On the first clock cycle C when pulse GD is active, row address line 192 (G0) goes active to enable the gate electrodes of the TFTs in the first row of pixels. On the next successive clock cycle C, row address line 192 (G0) switches back low, while the next row address line 194 (G1) goes active. This process continues until, on the 96th clock cycle, row address line 196 (G95) goes active.

Figure 12:
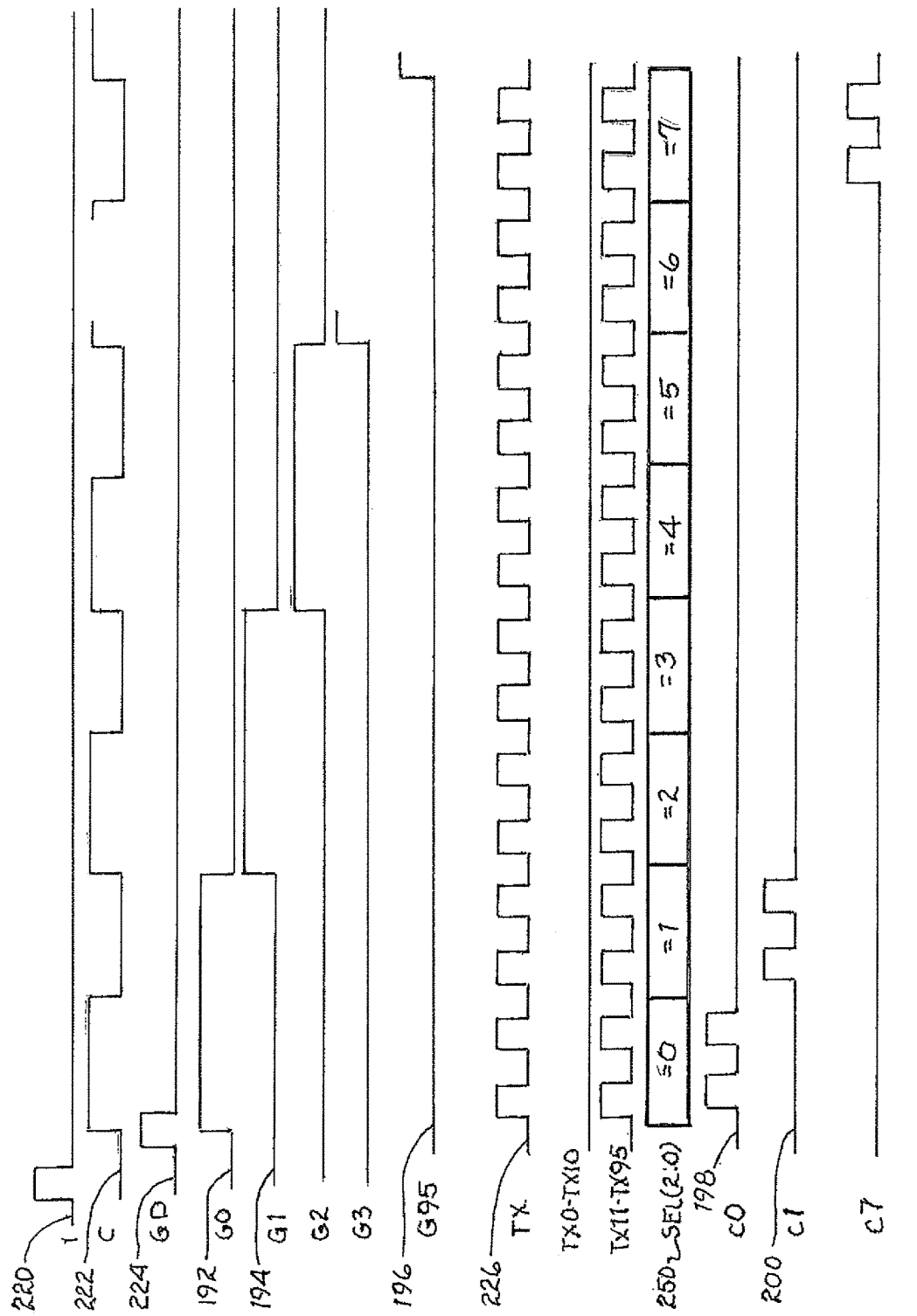
FIG. 12 is a timing diagram showing timing waveforms for signals depicted in FIGS. 9-11.

Still referring to FIGS. 9, 10 and 12, Tx signal 226 represents the high frequency signal to be transmitted into the user's fingertip. As stated above, Tx signal 226 may be provided by IC chip 86, or from an external source. A further signal TD is provided on line 228 as an input to a first flip-flop register 230. The output of flip-flop register 230 is coupled to an AND gate 232. When the output of flip-flop register 230 is low, AND gate 232 blocks signal TX on line 226 from being transmitted to TX0 line 204. The output of flip-flop register 230 also serves as the data input to a next successive flip-flop register which likewise controls an AND gate driving TX1 line 206, and so forth.

In regard to FIGS. 9 and 10, Applicants have determined that it is satisfactory to have approximately ten rows of inactive transmitter lines on each side of the active row of the pixel array being sensed at any given time. Thus, if the first row of pixels is being selected by gate electrode 192, it is then desired to disable the first ten transmission electrodes 204 (TX0), 206 (TX1), . . . through TX9. Initially, the first eleven flip-flops, including first flip-flop 230, are reset by the Initialize (I) signal 220, while the remaining flip-flops are set by the Initialize (I) signal 220. Thus, when the first row of pixels is selected, the first eleven transmission electrodes 204 (TX0), 206 (TX1), . . . through TX10 are disabled by their respective AND gates (including AND gate 232), while TX11 through TX95 are enabled, for a total of 85 active transmission electrodes initially.

For each succeeding clock cycle, another transmission electrode is disabled, until the number of active transmission electrodes decreases to 76. During the first ten clock cycles of clock signal 222 (C), the TD input signal 228, provided by IC chip 86, is maintained at a logic low level ("0") to keep the first eleven transmission electrodes 204 (TX0), 206 (TX1), . . . through TX10 disabled by their respective AND gates, while one additional transmission electrode to the right becomes disabled. After ten such clock cycles, TD input signal 228 switches to a logic high level ("1"), and remains high for the remainder of the clock cycles used to finish reading each of the rows of pixels. Thus, as the eleventh row of pixels is selected by row address line G10, transmission electrode 204 (TX0) is enabled to transmit the high-frequency signal into the user's finger, while neighboring transmission electrodes TX1 through TX20 are disabled. This pattern is continued on each clock cycle, effectively providing ten inactive TX rows on either side of the selected row being sensed. As the active sensing row moves across the pixel array with each clock cycle, so does the "inactive range" of the TX transmission electrodes. As the last twenty rows are selected for sensing, the number of inactive transmission electrodes begins to decrease from twenty down to ten. In the example shown, the maximum number of TX transmission electrodes that are disabled at any one time is twenty, but in that instance, at least 76 other TX transmission electrodes are enabled at the same time to reliably transmit the high frequency TX signal into the user's finger.

As shown in FIG. 12, during the time that row address line 192 (G0) is selected, transmission lines 204 (TX0), 206 (TX1) through 207 (TX10) remain low, or disabled. On the other hand, transmission lines 234 (TX11) through 208 (TX95) are actively driven with the high frequency TX signal to help transmit the TX signal into the user's fingertip. Similarly, when the row address line/gate electrode G10 is selected, the transmission electrodes for TX1 through TX10, and TX11 through TX20, are disabled, while all the other TX lines (i.e., TX0 and TX21-TX95) are enabled to help transmit the TX signal into the user's fingertip. In this manner, the pixel electrodes that are being sensed do not receive the transmitted TX signal directly from neighboring TX lines, but only as a result of the capacitive coupling between the pixel electrodes and the user's fingertip. Moreover, all of the logic circuitry shown in FIG. 10 for TFT row logic block 190 can be formed upon the same flexible substrate in which pixel array 72 is formed, using the same types of TFTs used to form the pixel array.

Figure 11:
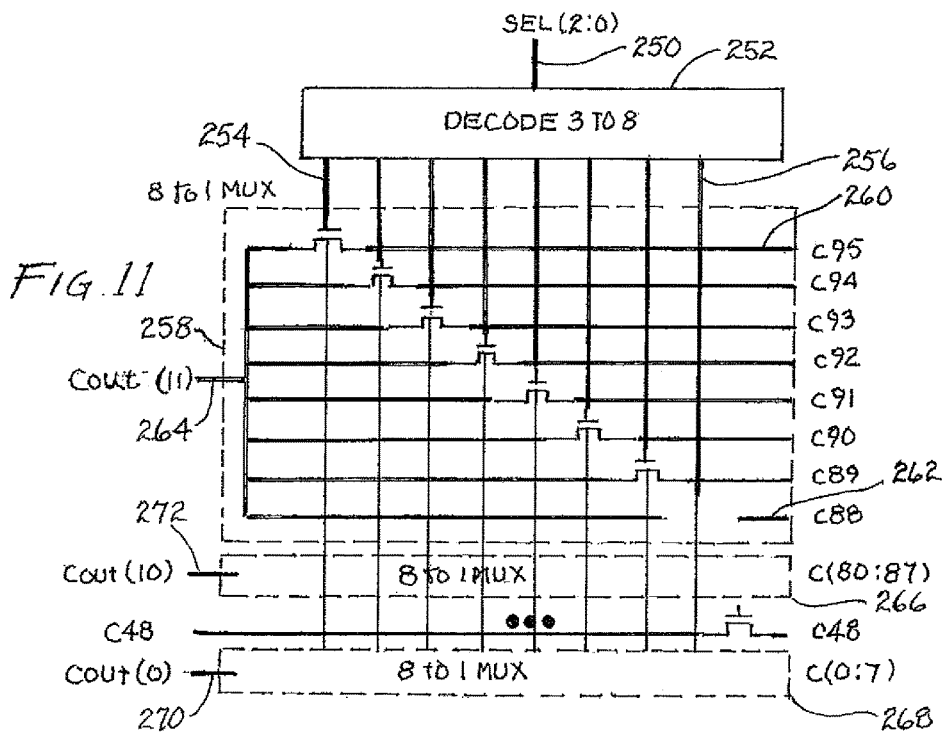
FIG. 11 is a block diagram illustrating a portion of the row addressing electrode demultiplexer, as well as the column decode multiplexer.

FIG. 11, together with the waveform diagram of FIG. 12, illustrates the manner in which the column decode circuitry 144 (see FIGS. 9 and 10) can be constructed as a multiplexer to reduce the number of conductive lines running between pixel array 72 and IC chip 86. Three binary selection signals, represented by bus 250, are received by a 3-to-8 decoder 252, which provides eight output lines, including lines 254 through 256. A first multiplexer, shown in dashed box 258, includes a series of eight TFTs. The first such TFT extends between column electrode 260 (c95) and output port 264 (Cout11). The last of such TFTs in dashed box 258 extends between column electrode 262 (c88) and output port 264 (Cout11). Thus, at any given time, one of the eight column electrodes c95 through c88 is coupled to output port Cout11.

Still referring to FIG. 11, there are eleven more such multiplexers provided, including those shown as 266 and 268, for providing data signals on output ports 270 (Cout0) through 272 (Cout10) in the same manner. Thus, at any given time, twelve output signals are provided via output ports 270 through 264 (Cout0 through Cout11). By cycling the selection bus signals 250 through each of their eight possible states, all 96 columns of data can be sensed and conducted to IC chip 86. As indicated in FIG. 12, the selection bus signals 250 are cycled through their eight possible states during each row address period so that all columns in a selected row can be sensed. Thus, in FIG. 12, when selection bus signals 250 are in a first state (=0), column c0 is sensed, and the transmitted TX signal waveform is recreated on line 198 (c0), to a greater or lesser extent, depending upon whether a ridge or valley of the user's fingertip lies above the corresponding pixel electrode. Similarly, when selection bus signals 250 are in a second state (=1), column c1 is sensed, and the transmitted TX signal waveform is recreated on line 200 (e1), to a greater or lesser extent, depending upon whether a ridge or valley of the user's fingertip lies above the corresponding pixel electrode.

Figure 13:
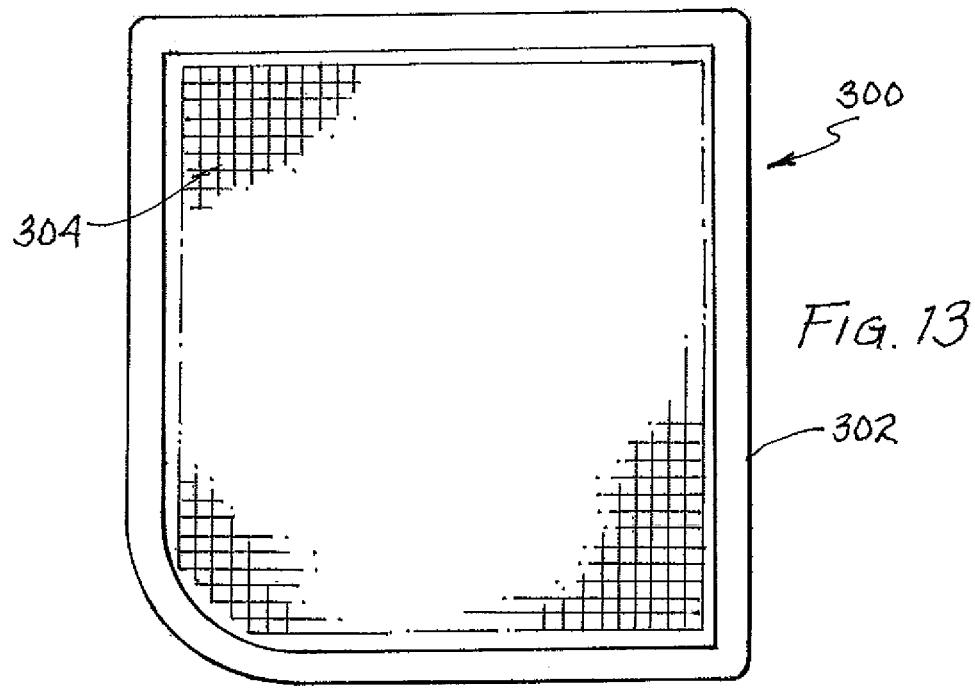
FIG. 13 is a top view of a fingerprint sensor area surrounded by a transmission electrode ring and adapted to be included as a portion of a touch-sensitive LCD panel.
Figure 14:
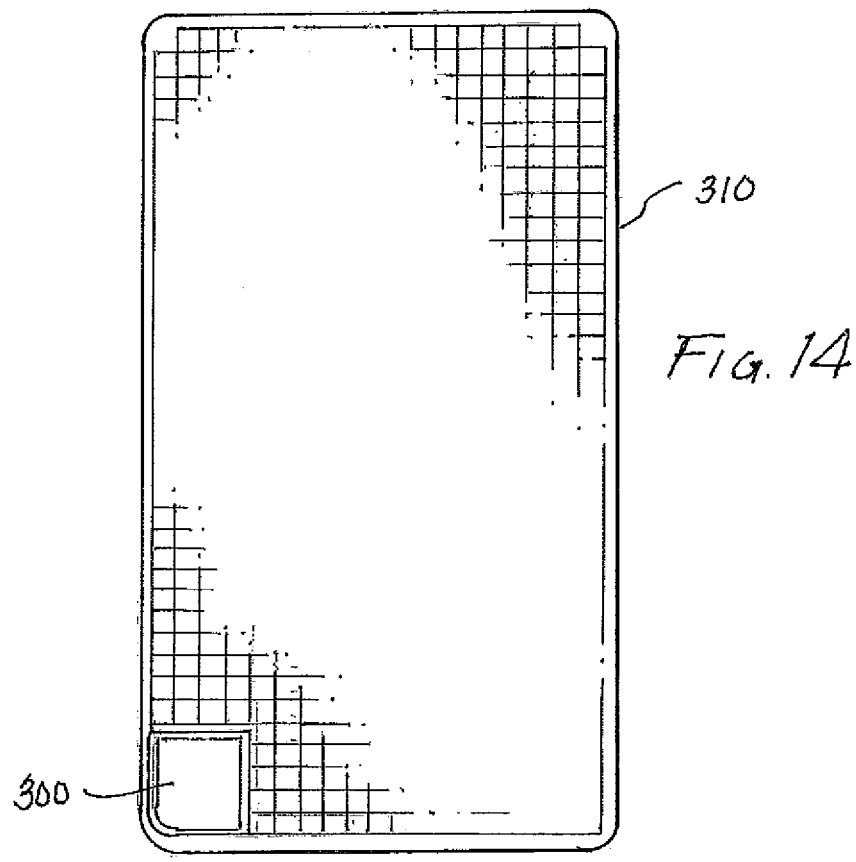
FIG. 14 is a top view of a rectangular touch-sensitive LCD panel wherein the fingerprint sensor area of FIG. 13 is incorporated within the lower left corner of the touch-sensitive LCD panel.

Those skilled in the art will appreciate that the fingerprint sensors described above may be incorporated within a conventional LCD touchpad of the type used in a computer with a touch screen monitor, a computer tablet, or a cell phone. For example, FIG. 13 illustrates a fingerprint sensor 300 of the general type described above in conjunction with FIGS. 3-8, including a transmission electrode ring 302 surrounding a pixel array 304. Turning to FIG. 14, cell phone LCD touchpad display panel 310 incorporates fingerprint sensor 300, of FIG. 13, within the lower left corner thereof.

A typical LCD touchpad, i.e., the portion of panel 310 of FIG. 14 lying outside fingerprint sensor area 300, is formed of a two-dimensional array of relatively low density pixels, arranged on a pitch of approximately 500 microns, i.e., the distance from the center of one pixel cell to the center of the next pixel cell is approximately 500 microns. The pixel density can be relatively low because the panel merely needs to detect that a fingertip, or stylus, is in contact with a region of display panel 310. In contrast, to function properly, fingerprint sensor array portion 300 should have higher density pixels, arranged on a much finer pitch of approximately 50-70 microns center-to-center. Thus, fingerprint sensor area 300 may have as many as ten rows of pixels for every pixel row in touchpad panel 310. Likewise, fingerprint sensor area 300 may have as many as ten columns of pixels for every pixel column in touchpad panel 310.

However, the technology used to fabricate fingerprint sensor area 300 is very similar to the technology used to fabricate the low density, touch-sensitive pixels throughout the remainder of display panel 310. Thus, while fingerprint sensor area 300 is shown in FIG. 14 as being limited to the lower left corner of display panel 310, it should be understood that fingerprint sensor area 300 could be expanded to cover the entire bottom of display panel 310, if desired, or any other area within display panel 310.

Figure 16:
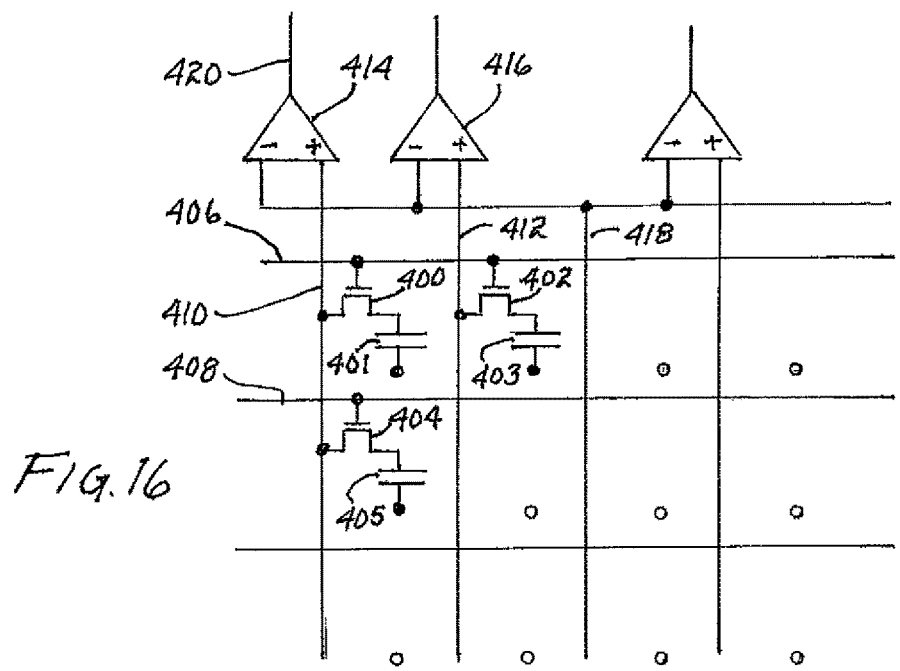
FIG. 16 is a simplified electrical schematic showing the manner in which the signals received by the TFT/capacitive plates of the pixel array are differentially sensed by differential amplifiers.

To further guard against extraneous noise signals, the accuracy of sensing the signals detected by the pixel electrodes may be further enhanced by sensing the pixel electrode signals in a differential mode. This approach allows for the removal of all types of common mode noise, whether originating from the human body itself, or from other sources such as the electronic equipment in which the fingerprint sensor is housed. Referring to FIG. 16, TFT 400 and its associated pixel electrode 401 form a first pixel of a fingerprint sensor area; TFT 402 and its associated pixel electrode 403 form a second pixel within the same row as TFT 400; and TFT 404 and its associated pixel electrode 405 form a third pixel within the same column as TFT 400. TFT 400 and TFT 402 are coupled to a first row addressing line 406. TFT 404 is coupled to a second row addressing line 408. The source terminals of TFT 400 and TFT 404 are both coupled to a first column electrode 410; the source terminal of TFT 402 is coupled to a second column electrode 412.

Still referring to FIG. 16, first column electrode 410 is coupled to a positive (non-inverting) input of a first differential amplifier 414. Similarly, second column electrode 412 is coupled to a positive (non-inverting) input of a second differential amplifier 416. Similar differential amplifiers are provided for the remaining column electrodes of the pixel array, except that, in one instance, as will be explained below, the number of such differential amplifiers may be one less than the number of column electrodes. Column electrode 418 is coupled to the negative (inverting) terminal of each of the differential amplifiers 414, 416, etc. Column electrode 418 runs the length of the pixel array to the same extent as typical column electrodes 410, 412, etc. Any stray, interfering signals that are received by typical column electrodes (e.g., 410 and 412) are also received by column electrode 418. Thus, differential amplifier 414 will effectively subtract the stray, interfering signal presented by column electrode 418 from the signal presented by column electrode 410, and the resulting output signal 420 will include the signal sensed by the pixel electrode in the selected pixel row, without unwanted noise components.

Within FIG. 16, column electrode 418 may be a "dummy" electrode that is not actually coupled to any active pixels, if desired. For best noise rejection of human body noise, this dummy column should be located in an area that is equally proximate to the user's finger as the actual column electrodes. Alternatively, column electrode 418 may be an actual column electrode associated with a particular column of pixels in the array; in that case, there will be no sensed data for the column electrode that was "sacrificed" to receive common mode noise. In order to recreate data signals for the missing column of the pixel array, it should be realized that fingerprints are not arbitrary data. By definition, a fingerprint includes ridges (maximums) and valleys (minimums), and a fingerprint image ranges between such minimum and maximum signals. One relatively simple method for reconstructing the data in the missing column of the pixel array is to compute the missing data value by looking at the values of the surrounding pixels, and interpolating the value in each row of the missing column.

It has been mentioned above, relative to FIGS. 13 and 14, that fingerprint sensor area 300 may be incorporated within a conventional LCD touchpad panel 310. To further aid in the integration of fingerprint sensor area 300 within a conventional LCD touchpad panel, fingerprint sensor area 300 may be selectively operated in a mode that mimics the operation of the surrounding lower density sense pixels.

Figure 17B:
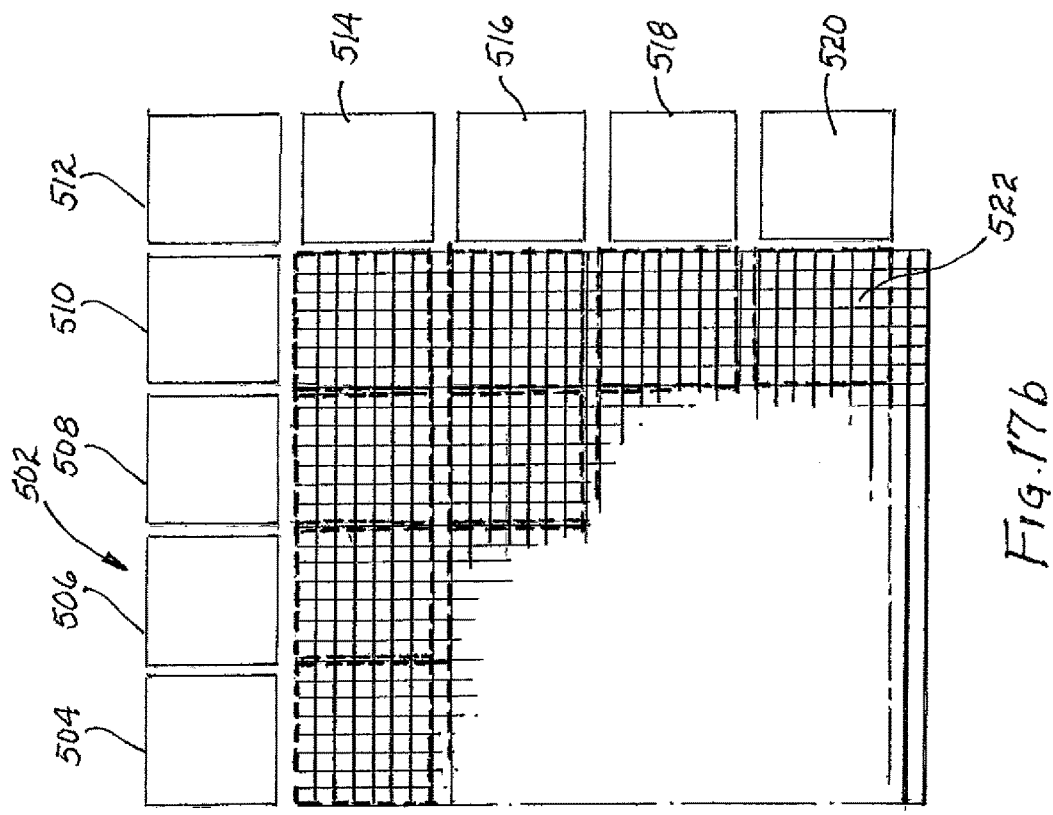
FIG. 17b is a view similar to that of FIG. 17a but illustrating how the higher density pixels can be ganged together to simulate, or mimic, the function of the adjacent lower density pixel cells.
Figure 17A:
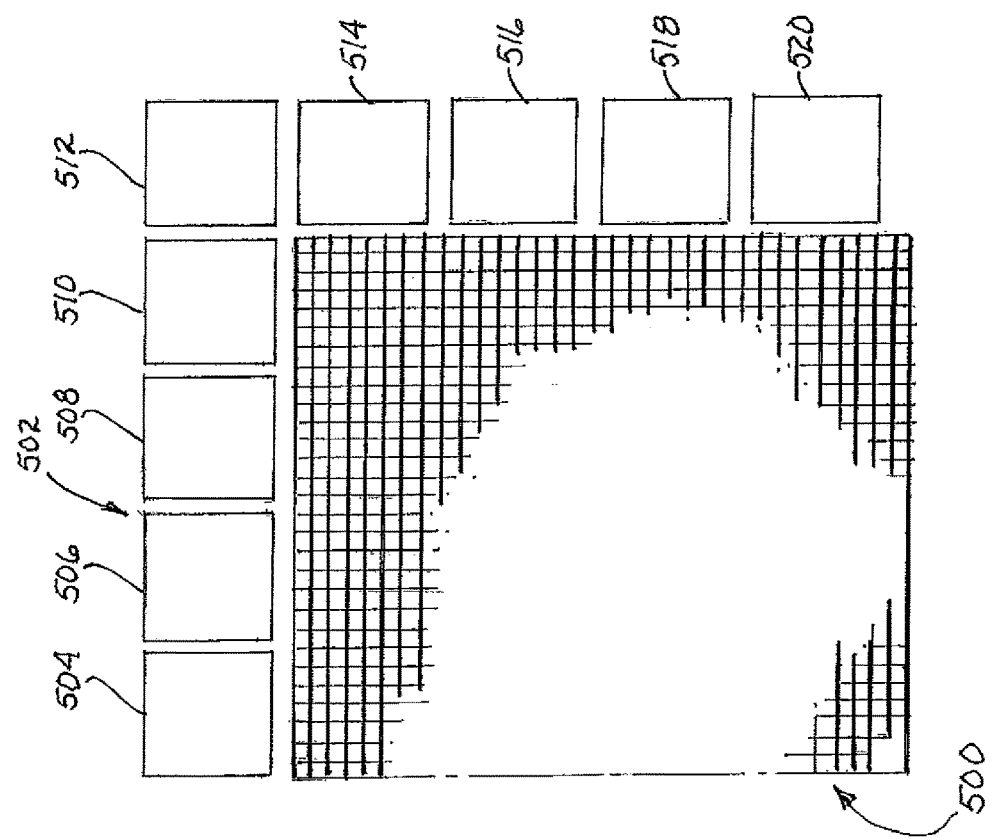
FIG. 17a illustrates the higher density pixels of the fingerprint sensor area of the touch-sensitive LCD panel of FIG. 14 adjacent to lower density pixel cells.

Referring to FIG. 17a, fingerprint sensor area 500 is formed in the lower left corner of touchpad display panel 502. In this example, the surrounding transmission ring 302 of FIG. 13 is omitted in favor of interleaved transmission electrodes operated in the general manner described above in conjunction with FIGS. 9-12. Touchpad display panel 502 includes an array of low density sense pixels 504 through 520. Each sense pixel 504 through 520 serves to detect whether a user's fingertip, or a stylus, is being placed against a cover glass directly above such sense pixel. In the example shown in FIG. 17a, there are approximately seven high-density pixels, per linear length, in fingerprint sensor area 500 for every single low density pixel (e.g., 504). The region occupied by fingerprint sensor area 500 replaces what would otherwise have been a four-by-four array of low density pixels. When fingerprint sensor area 500 is being used in "fingerprint mode" to generate a fingerprint image, each pixel electrode in the pixel array is individually addressed and sensed in the manner already described above.

Turning to FIG. 17b, during the "mimic mode" of operation, groupings of seven-by-seven pixels within fingerprint sensor area 500 are ganged together to form virtual low density pixels, to mimic the low density pixels 504-520 of touchpad panel 502. As shown in FIG. 17b, virtual low density pixel 522 is formed by a seven-by-seven array of high density pixels. When FPS area 500 is configured to mimic the touch pad area 502, the rows of FPS area 500 are selected, or de-selected, in a ganged mode. The number of rows in FPS area 500 that are enabled/selected at any one time depends on the size of the higher density FPS pixels versus the size of the lower density touchpad pixels. In the example shown in FIGS. 17a and 17b, groups of seven row of FPS area 500 are ganged together. Apart from selecting seven adjacent rows simultaneously, seven adjacent column electrodes are also shorted together. In this manner, the signals collected on the pixel electrodes of 49 pixels (7×7) are averaged together, providing one output signal that mimics signals produced by each of the lower density pixels (e.g., 504, 506, etc.) of touchpad display panel 502. Those skilled in the art will appreciate that, in this "mimic mode" of operation, it would be possible, if desired, to couple the ganged/shorted column electrodes in FPS area 500 with the existing column lines of the touchpad panel for sensing and processing of the signals provided thereby.

Figure 18:
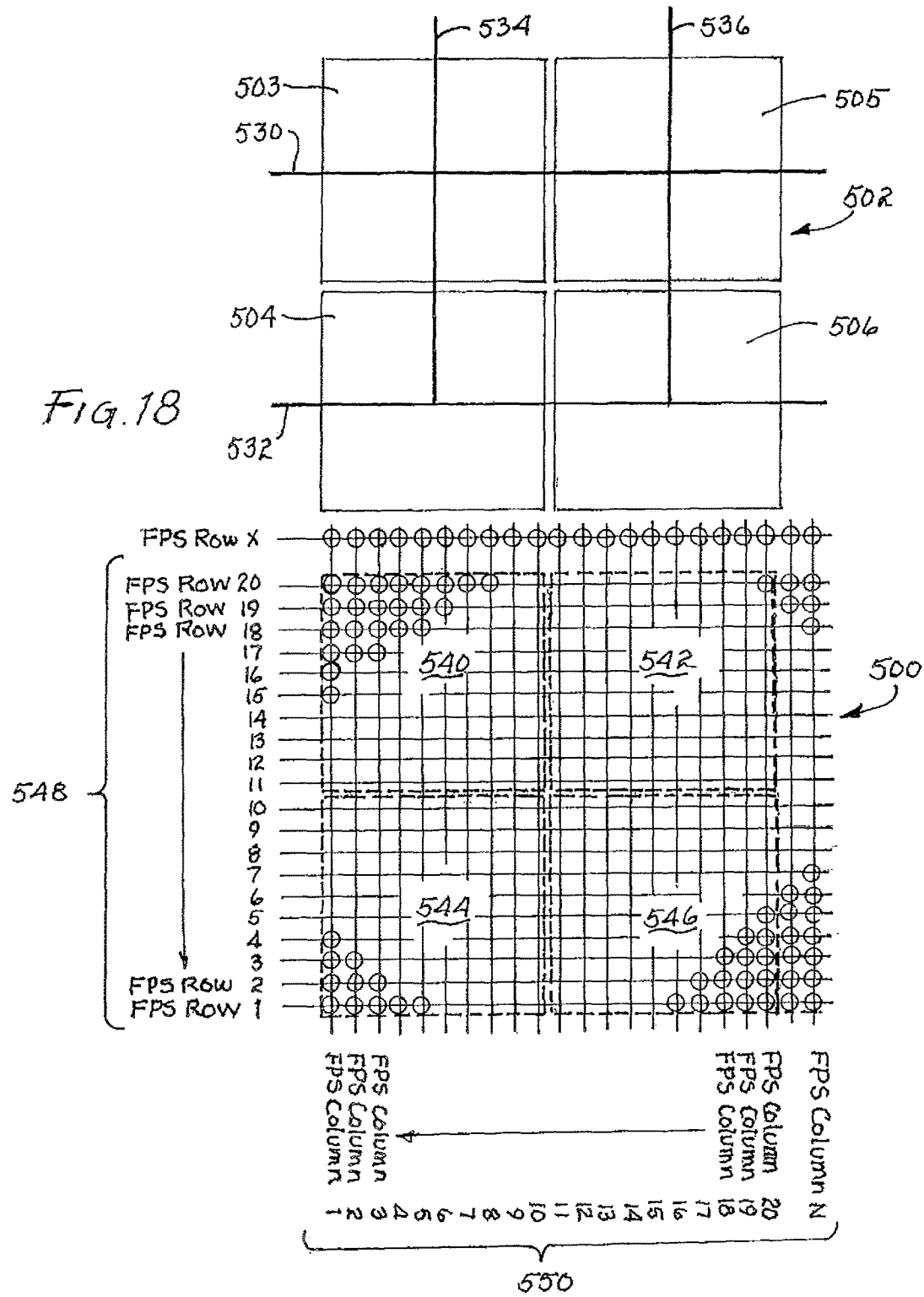
FIG. 18 is an enlarged view of four conventional pixel cells above, and four ganged pixel cells formed by the higher density pixel cells below, along with corresponding metal electrodes.

As shown in FIG. 18, four low density pixels of touch pad 502 include 503, 504, 505 and 506. These low density sensor pixels are addressed by row lines 530 and 532, and by column lines 534 and 536. In FIG. 18, the higher density pixels of fingerprint sensor area are shown ganged together, this time at a higher density of ten pixels by ten pixels per virtual low density pixel. In this example, the touchpad pixels (503, 504, 505, 506) are 500 um×500 um, while the FPS pixels are 50 um×50 um. In order for the FPS area to mimic the touchpad area, FPS Row 1 through FPS Row 10 are turned "ON" at the same time, and the FPS columns are shorted together in groups of 10 columns (i.e., FPS Column 1 through FPS Column 10 shorted; FPS Column 11 through FPS Column 20 shorted; . . . etc. . . . ). In this manner, the virtual FPS pixel size can be increased from 50 um×50 um to 500 um×500 um. Ganging the FPS rows together by selecting multiple rows at the same time, and the shorting of the desired number of columns together, is accomplished using the TFTs. This method allows a fine pixel FPS to mimic the large pixel of the touch pad.

The higher density pixels of fingerprint sensor area 500 are addressed by row selection lines 548, and the columns of the selected rows are sensed by column electrode lines 550. Four virtual low density pixels are designated 540, 542, 544 and 546. Ten row address lines (FPS Row 11 through FPS Row 20) can individually address each of the ten rows (11-20) within virtual low density pixel 540 when a fingerprint image is required, or all ten of such rows can be selected at the same time when mimicking the operation of the lower density pixels. Similarly, ten column sensing electrodes (FPS Column 1 through FPS Column 10) can individually sense each of the ten columns (1-10) within virtual low density pixel 540 when a fingerprint image is required, or all ten of such columns can be shorted together when mimicking the operation of the lower density pixels.

Figure 19:
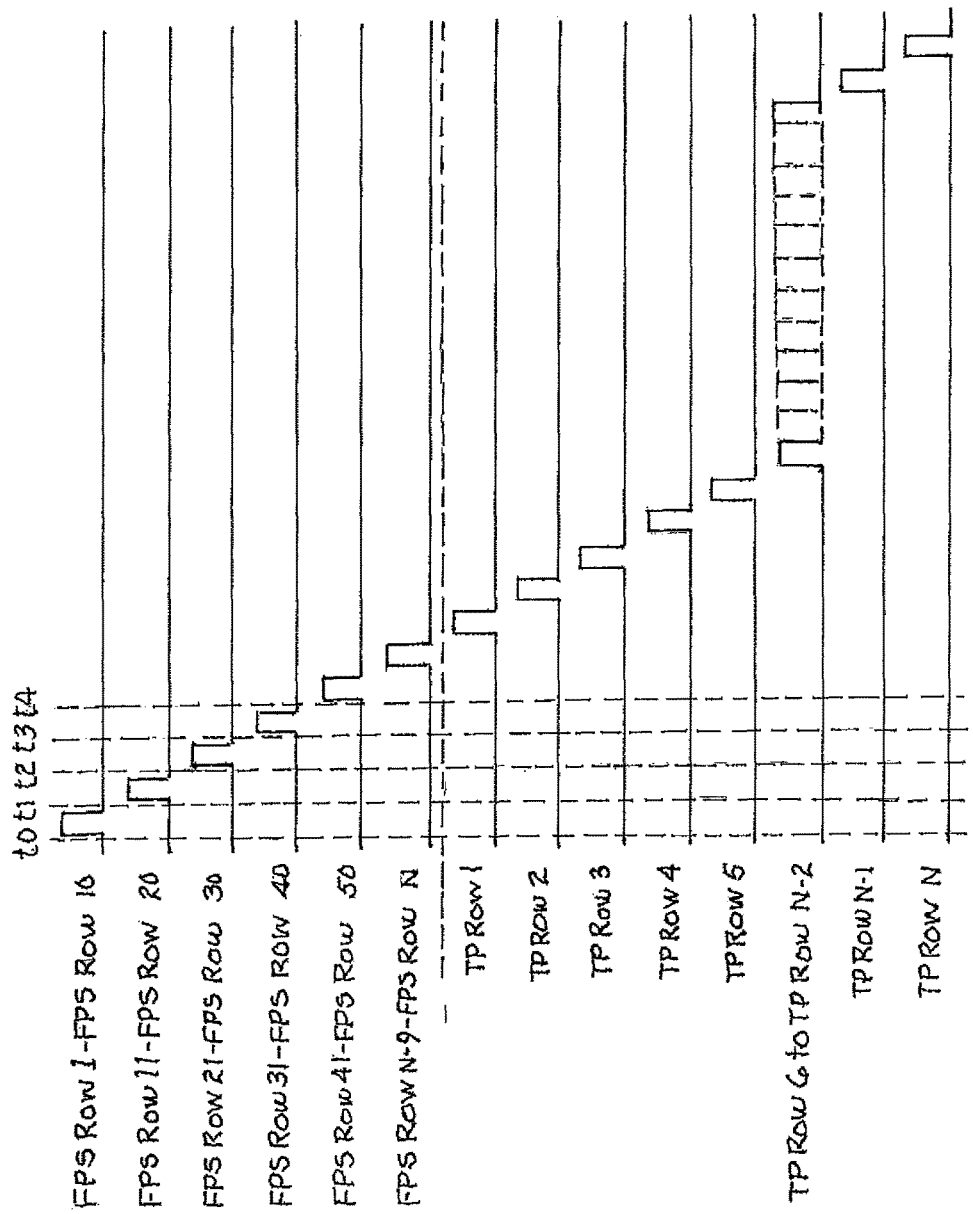
FIG. 19 is a timing diagram showing timing waveforms for the signals conducted by the electrodes shown in FIG. 18.

The timing waveform of FIG. 19 further illustrates the operation of the fingerprint sensor area (FPS) 500, and its higher density pixels, when being used to mimic the operation of the lower density pixels. During a first clock cycle (t0), FPS Rows 1-10 are all enabled so that virtual pixels 544 and 546 can be selected. During that same clock cycle, FPS Columns 1-10 are shorted to sense virtual pixel 544, and FPS Columns 11-20 are shorted to sense virtual pixel 546. During the next clock cycle, (t1), FPS Rows 1-10 are all disabled once more, while FPS Rows 11-20 are all enabled so that virtual pixels 540 and 542 can be selected. Once again, during clock cycle t1, FPS Columns 1-10 are shorted to sense virtual pixel 540, and FPS Columns 11-20 are shorted to sense virtual pixel 542. This process continues until all virtual pixels have been sensed. Thereafter, a sufficient number of additional clock cycles follow during which the rows of the touchpad panel (i.e., TP Row 1; TP Row 2; TP Row 3; . . . TP Row N), including rows 530 and 532, are individually selected, and touchpad column lines (e.g., 534 and 536) are sensed to determine whether any of the pixels in the selected touchpad row are being touched by a user's finger or a stylus.

Figure 15B:
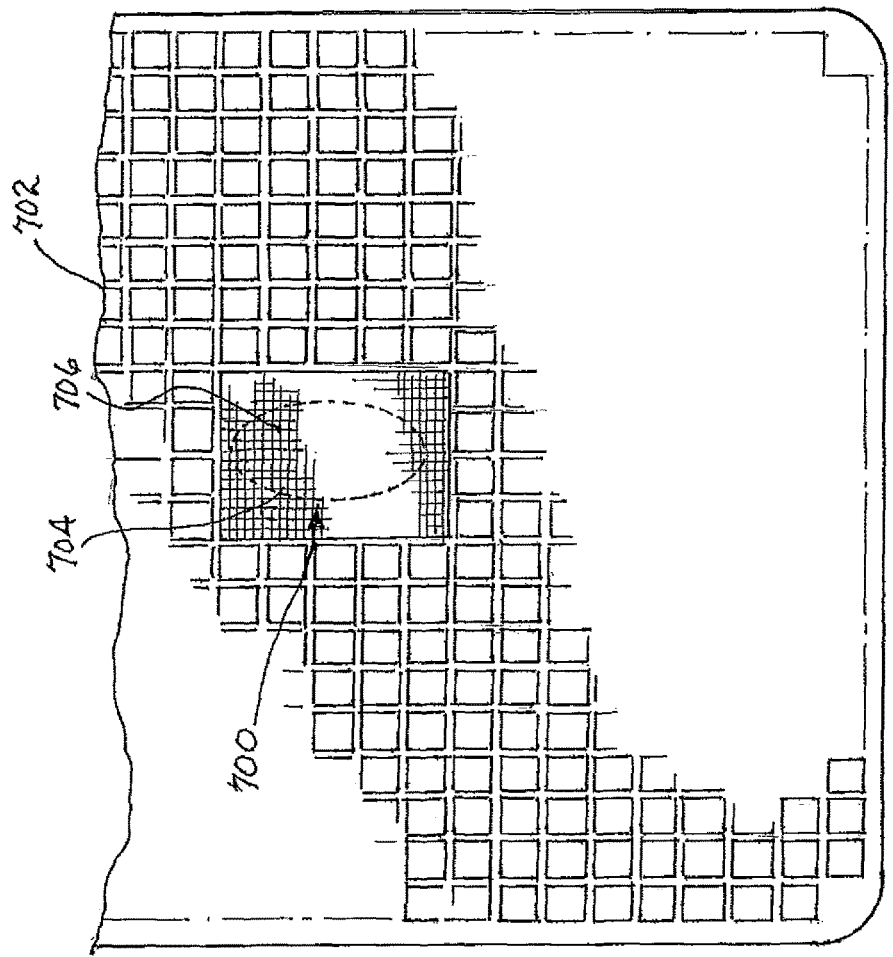
FIG. 15b is an enlarged view of a portion of the touch-sensitive LCD panel shown in FIG. 15a, and wherein a region contacted by a user's finger is re-configured as a higher-pixel density fingerprint sensor area.
Figure 15A:
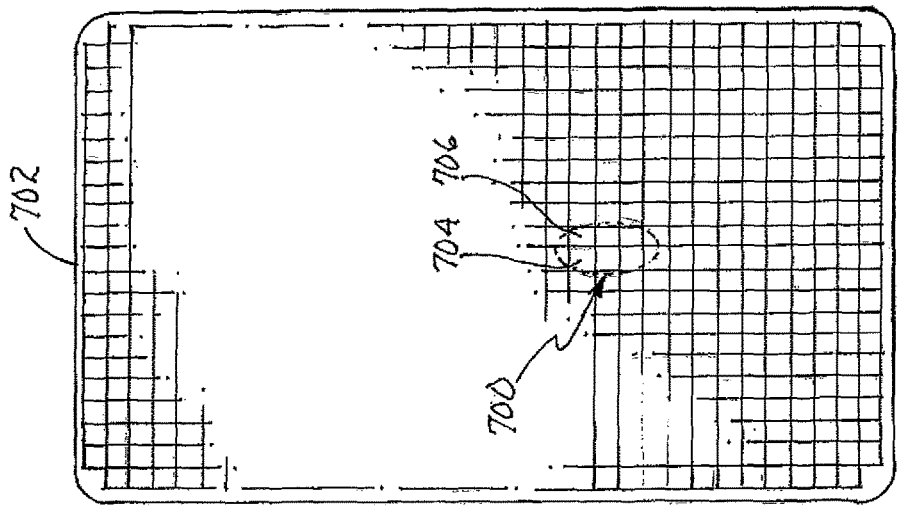
FIG. 15a is a top view of a touch-sensitive LCD panel generally similar to that shown in FIG. 14 but formed entirely of high-density pixels sub-divided into lower-density touch pad pixels.

Reference is now made to FIGS. 14 and 15*b* which illustrate an LCD touch-sensitive panel, or touch pad, which is formed of a high-density TFT/capacitive plate pixel array, but which is usually operated in a lower-density touch pad mode. When operated in touch pad mode, the higher density (finer-pitch) pixels mimic the operation of lower density touch pad pixels in the manner already explained above. FIGS. 15*a* and 15*b* also aid in illustrating a method of operating such a touch pad wherein a fingerprint sensor area can be selectively provided at whichever location of the touch pad that a user happens to be applying his or her finger. In FIG. 15*a*, touch pad 702 includes an array of low-density touch pad pixels, including adjacent touch pad pixels 704 and 706. In FIG. 15*a*, a user's fingertip is being applied against a "contact" region, namely, the area of the touch pad designated by dashed oval 700.

FIG. 15*b* is an enlargement of the lower half of touch pad 702, and dashed oval 700 is shown superimposed over a rectangular region of touch pad 702 formed by touch pad pixels that lie near dashed oval 700, including the areas corresponding to touch pad pixels 704 and 706. However, in FIG. 15*b*, touch pad pixels 704 and 706, and other touch pad pixels lying near dashed oval 700 have been switched to fingerprint sensor mode, wherein the finer-pitch, high-density pixels are now operated individually, rather than collectively, to provide higher resolution than when operated in touch pad pixel mode.

The ability of touch pad 702 to mimic a lower density touch pad enables the entire touch panel area, or any portion of the touch panel area, to be utilized as a fingerprint sensor area. A finger print image can be taken from any location on touch panel 702, if desired. Initially, touch pad 702 can be configured as a conventional touch pad by shorting addressing rows together, and shorting column sensing lines together, to form larger, less dense pixels, as described above. Alternately, touch panel 702 could be used as one large, high-resolution fingerprint sensor, in which one finger, multiple fingers, or even portions of a person's palm, could be sensed. Lastly, touch panel 702 could be configured as a touch pad to first detect where a person's fingertip is located, and then, dependent upon the fingertip location, configure the detected location as a fingerprint sensor area to image the person's fingerprint.

Whether touch panel 702 is being used as a touch pad or as a fingerprint sensor area, the general location at which the user is applying his or her fingertip can be detected. When touch panel 702 mimics the operation of a conventional touch pad, the same methods currently used to determine finger location, and finger swipe direction, for conventional touch pads may also be used for the same purposes for touch panel 702. Once the location of the fingertip is determined, the immediately surrounding region is converted to a high-resolution fingerprint sensor area for allowing a high quality image of a fingerprint to be captured.

In practicing the method illustrated by FIGS. 15*a* and 15*b*, an array of finer-pitch pixels are arranged along intersecting rows and columns essentially across the entire surface of the touch panel 702. As described earlier, each finer-pitch pixel preferably includes a switching device (e.g., a TFT) and a capacitive plate for sensing a high-frequency signal transmitted through the user's finger. A series of finer-pitch row address lines are provided, each being associated with a row of finer-pitch pixels in the array. Each finer-pitch row address line can selectively address the finer-pitch pixels associated with the corresponding row of the array. As before, a plurality of finer-pitch column sensing lines are also provided, each finer-pitch column sensing line being associated with a column of finer-pitch pixels in the finer-pitch pixel array. Each such finer-pitch column sensing line can sense a signal provided by the capacitive plate of a finer-pitch pixel in a selected row of the finer-pitch pixel array. While not shown in FIG. 15*a* or 15*b*, those skilled in the art will understand that high-frequency signal transmitter electrodes, as described above relative to FIGS. 9 and 10, can be included in the pixel array, and can be selectively enabled and disabled, to effectively transmit the high-frequency signal into a user's fingertip applied to the "contact" region of touch pad 702.

As mentioned above in regard to FIGS. 17*a*, 17*b*, and 18, the finer-pitch pixels are grouped, or sub-divided, into an array of larger touch pad pixels, like touch pad pixels 704 and 706 in FIG. 15*b*, which are also arranged in rows and columns. The array of touch pad pixels is a "smaller array" in the sense that it includes fewer rows and columns, though it covers the same basic two-dimensional space. Each such touch pad pixel includes finer-pitch pixels located in at least two, and typically five or more, different rows of the finer-pitch pixels. Likewise, each of the touch pad pixels includes finer-pitch pixels located in at least two, and typically five or more, different columns of the finer pitch pixels. The center-to-center distance from one such touch pad pixel to the next adjacent touch pad pixel is at least twice as large, and more typically, five or more times larger than the center-to-center distance from one finer-pitch pixel to the next adjacent finer-pitch pixel.

Still referring to FIGS. 15a and 15b, the aforementioned method includes a first mode of operation in which all of the finer-pitch pixels within touch pad 702 are configured to mimic the operation of lower density touch pad pixels, like 704 and 706. In this first mode of operation, the finer-pitch pixels that collectively form touch pad pixel 704, for example, are simultaneously enabled for collective operation. In other words, all of the row address lines for the finer-pitch pixels located in touch pad pixel 704 are enabled at the same time (i.e., the row addressing lines that enable that group of finer-pitch pixels are effectively shorted together). Likewise, the column sensing electrodes coupled to the finer-pitch pixels located in touch pad pixel 704 are also effectively shorted together for collectively sensing the signals provided by the capacitive plates of all of the finer-pitch pixels located within touch pad pixel 704. In this manner, each such touch pad pixel mimics the function of a conventional touch pad pixel of a conventional touch pad during the first mode of operation. During such first mode of operation, signals provided by the touch pad pixels are used to detect whether a pointer (a fingertip, a stylus, etc.) is being applied proximate to the upper surface of touch pad 702, and if so, the location of such pointer on touch pad 702 is also detected.

Referring to FIG. 15b, touch pad 702 can be changed to a second mode of operation when, for example, an image of a user's fingertip is to be imaged. During this second mode of operation, it is determined which touch pad pixels lie proximate to the pointer location. For example, in FIG. 15b, a group of 20 touch pad pixels (extending four touch pad pixels across, and five touch pad pixels tall) are determined to lie proximate to the pointer location; among those 20 touch pad pixels are those designated 704 and 706 in FIG. 15a. Those 20 touch pad pixels are then re-configured, i.e., selectively switched, back to the finer-pitch pixels that can be individually addressed and sensed. During this individual mode of operation, the finer-pitch pixels in each finer-pitch row are individually enabled, and the signal provided by each capacitive plate of each such finer-pitch pixel is individually sensed as each finer-pitch row is enabled by a corresponding finer-pitch row address line. This is why, in FIG. 15b, the array, or grid illustrated in "contact" region 700 is drawn as being much more dense then the touch pad pixels located outside "contact" region 700. Accordingly, the individual finer-pitch pixels within "contact" region 700 are now configured to form a fingerprint sensor area for sensing a fingerprint image of a user's fingertip.

FIGS. 15a and 15b illustrate the manner in which touch pad 702 can provide a fingerprint sensor area proximate to a contact region currently being touched by a user's finger, anywhere within touch panel 702. Those skilled in the art will appreciate, however, that if desired, the fingerprint sensor area could be expanded to encompass the entire surface of touch pad 702. In other words, every touch pad pixel shown in FIG. 15a could be switched from its first (or "mimic") mode of operation to its second (or "individual") mode of operation, resulting in the entire touch pad surface being operated in high-density pixel mode. In this manner, two or more fingerprints, or even a palm print, image could be sensed.

Figure 20A:
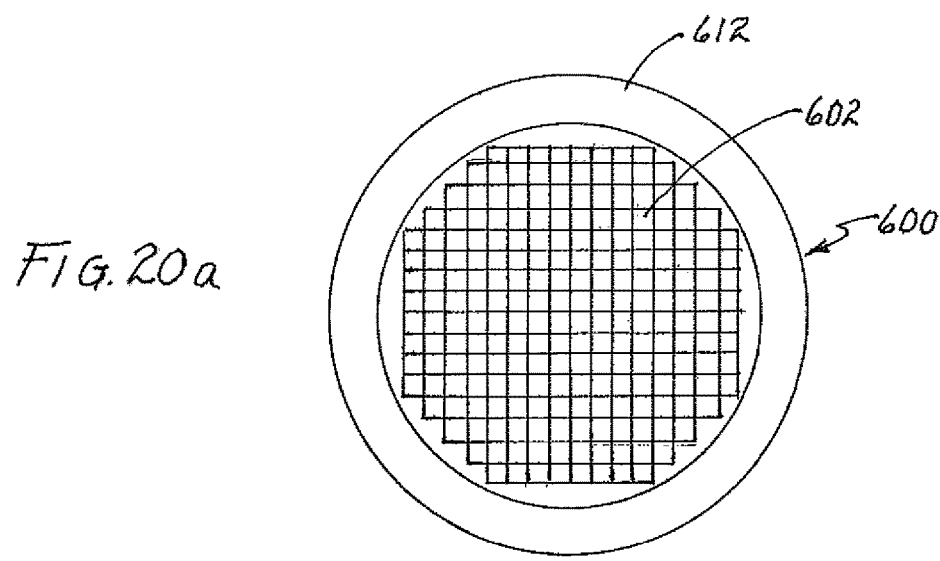
FIG. 20a is a top view of a fingerprint sensor constructed in accordance with the present invention and embodied as a button.
Figure 20B:
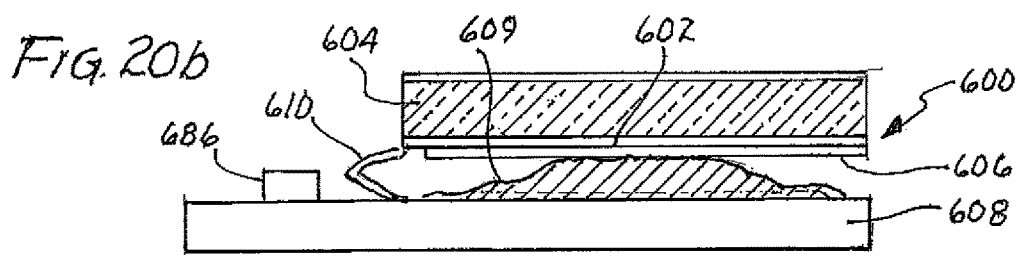

A fingerprint sensor of the type generally described above may also be incorporated within a button, as illustrated in FIGS. 20a and 20b. Button 600 may, for example, be a security feature on a protected doorway, an elevator, etc., wherein admission is limited to those whose fingerprint matches a stored fingerprint of an individual whose identity has previously been verified. Button 600 includes a pixel array 602 covered by a protective layer of glass 604. The pixel array is formed upon a flexible substrate 606 mounted to a printed circuit board 608 by an adhesive 609. An integrated circuit chip 686 is mounted to printed circuit board 608. A flexible electrical connector 610 extends between flexible substrate 606 and printed circuit board 608 for making electrical connections between pixel array 602 and IC chip 686. Within FIG. 20a, surrounding ring 612 may be provided to transmit the high frequency signal into the user's finger as the user depresses the button with his or her fingertip. Alternatively, the outer transmission electrode may be omitted, if desired, and transmission electrodes may be selectively activated, away from the particular row being sensed at a given moment, in the manner already described above.

Those skilled in the art will appreciate that the fingerprint sensor described herein lends itself to applications for touch electronics, and increases the ability of the sensor to read fingerprint images through thicker protective surfaces that provide greater protection to the underlying pixel array. Thus, for example, the present fingerprint sensor can be used successfully with thick cover glasses often provided in cell phone touch display panels. In addition, the apparatus described herein can be used with a relatively small integrated circuit chip, independent of the dimensions of the pixel array, which reduces cost of manufacture. The disclosed fingerprint sensor provides an increase in signal strength, and improved signal-to-noise ratio through thick materials, and the ability to keep the signal "focused" through thicker materials, so that the image of the finger ridges and valleys is at a high enough resolution for proper detection. The invention described herein can be used in any application which uses a touch sensitive surface such as cell phones, touch pads, notebooks, notepads, E-readers, and the like. The invention can be used to embed biometric security within electronic products with minimal impact to product size, cost, and processing.

From the foregoing description of the preferred embodiments, those skilled in the art will recognize that the present invention provides a fingerprint sensor for imaging a person's fingerprint without requiring the use of an integrated circuit semiconductor chip of the same dimensions as the pixel array used to capture the image of the fingerprint, thereby significantly lowering production costs. The fingerprint sensor of the present invention more readily distinguishes the ridges and valleys of a fingertip applied to a cover plate overlying the pixel array, even with relatively thick cover plates. The disclosed invention effectively transmits a high frequency carrier signal into the person's fingertip without simultaneously coupling such carrier signal directly into the pixel array, i.e., the carrier signal is forced to pass into the user's fingertip before being transmitted back into the pixel array.

As noted above, a fingerprint sensor constructed in accordance with the present invention also significantly reduces the number of electrical lines which must extend between the pixel array and an associated integrated circuit, used to process the fingerprint image captured by the pixel array, largely by demultiplexing the row address lines and/or by multiplexing the column data lines. The present invention lends itself to differential sensing of the signals detected by the pixel electrodes, resulting in improved rejection of common mode noise signals. A fingerprint sensor of the present invention can easily be incorporated within a conventional touch-sensitive pad, and can even mimic the lower density pixels of the touchpad when not being used to form an image of a fingerprint, while using the same sensing layers, and same fabrication techniques.

While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

We claim:

1. A fingerprint sensor comprising in combination:
    a) a first substrate having a plurality of pixels formed therein, the first substrate comprising an upper surface, the pixels being arranged in a pixel array of R rows and N columns, each pixel comprising a switching device and further comprising a capacitive plate proximate the upper surface of the first substrate;
    b) a plurality of R row addressing electrodes, each such row addressing electrode being coupled to the switching devices of the pixels in a corresponding row of the pixel array for selectively enabling the switching devices in the corresponding pixel row;
    c) a plurality of N data electrodes, each such data electrode being coupled to the switching devices of the pixels in a corresponding column of the pixel array for sensing a signal provided by the capacitive plate of the pixel located at an intersection of a selected pixel row and the corresponding column of the pixel array;
    d) a cover layer overlying the upper surface of the first substrate for receiving a fingertip of a user;
    e) at least one transmitter electrode formed proximate to the upper surface of the first substrate and laterally spaced apart from the pixel array for transmitting a varying amplitude electrical signal;
    f) whereby the varying amplitude electrical signal transmitted by the at least one transmitter electrode is coupled into a finger of a user who places his or her fingertip over the cover layer, and wherein the electrical signal coupled into the user's finger is further coupled through the capacitive plates in the pixel array to a greater or lesser extent, depending upon whether a ridge or valley of the user's fingertip overlies a particular pixel in the pixel array.

2. The fingerprint sensor recited by claim 1 wherein the switching devices included in the pixel array are thin-film-transistors (TFTs).

3. The fingerprint sensor recited by claim 1 wherein the at least one transmitter electrode extends substantially entirely around the pixel array.

4. The fingerprint sensor recited by claim 1 wherein the first substrate and cover layer are integrally formed.

5. The fingerprint sensor recited by claim 1 wherein the first substrate is relatively flexible.

6. The fingerprint sensor recited by claim 1 further comprising:
    g) a second substrate being different from the first substrate, the second substrate comprising a semiconductive material;
    h) an integrated circuit formed within the second substrate, the integrated circuit generating a set of S row addressing signals to address one of the plurality of R row addressing electrodes, the integrated circuit also being selectively coupled to the plurality of N data electrodes to receive the signals provided by the capacitive plates in the pixel array; and
    i) a demultiplexer coupled between the integrated circuit and the pixel array, the demultiplexer comprising at least S input terminals for receiving the first set of S row addressing signals, the demultiplexer comprising at least R output terminals, each of the R output terminals being coupled to one of the plurality of R row addressing electrodes, the demultiplexer selecting one of the plurality of R addressing electrodes based upon the S row addressing signals received thereby.

7. The fingerprint sensor recited by claim 6 wherein the demultiplexer is formed by a plurality of switching devices.

8. The fingerprint sensor recited by claim 7 wherein the plurality of switching devices forming the demultiplexer are thin-film-transistors formed upon the first substrate.

9. The fingerprint sensor recited by claim 1 wherein the at least one transmitter electrode forms a ring encircling the pixel array.

10. A touchpad incorporating a fingerprint sensor for sensing a user's fingerprint, comprising in combination:
    a) a substrate having an upper surface;
    b) an array of sensor pixels formed in said substrate and arranged along intersecting rows and columns for sensing the presence and location of a pointer applied proximate to said upper surface of the substrate, adjacent sensor pixels being spaced apart from each other by a first predetermined distance, each sensor pixel providing a signal indicative of whether a pointer is being applied proximate to such sensor pixel;
    c) a plurality of row address lines supported by the substrate, each row address line being associated with a row of sensor pixels in the array of sensor pixels, and each row address line being selectively enabled for addressing the sensor pixels associated with each such row address line;
    d) a plurality of column sensing lines supported by the substrate, each column sensing line being associated with a column of sensor pixels for sensing a signal provided by a sensor pixel in a row of sensor pixels selected by an enabled row address line;
    e) a fingerprint sensor area formed upon the substrate, the fingerprint sensor area comprising:
        i) a plurality of finer-pitch pixels arranged along intersecting rows and columns to form an array of finer-pitch pixels, each finer-pitch pixel comprising a switching device and further comprising a capacitive plate, each finer-pitch pixel being spaced apart from adjacent finer-pitch pixels by a second predetermined distance, the second predetermined distance being less than one-third the first predetermined distance;
        ii) a plurality of finer-pitch row address lines, each finer-pitch row address line being associated with a row of finer-pitch pixels in the array of finer-pitch pixels, and each finer-pitch row address line being selectively enabled for addressing the finer-pitch pixels associated with each such finer-pitch row address line;
        iii) a plurality of finer-pitch column sensing lines, each finer-pitch column sensing line being associated with a column of finer-pitch pixels for sensing a signal provided by the capacitive plate of a finer-pitch pixel in a row of finer-pitch pixels selected by an enabled finer-pitch row address line; and f) at least one of the i) touchpad row address lines, or ii) touchpad column sensing lines, bordering the fingerprint sensor area also serving as a transmitter electrode for transmitting a varying amplitude electrical signal when the fingerprint sensor area is being used to sense a user's fingerprint;

g) whereby the varying amplitude electrical signal transmitted by the transmitter electrode is coupled into a finger of a user who places his or her fingertip over the fingerprint sensor area, and wherein the electrical signal coupled into the user's finger is further coupled through the capacitive plates in the array of finer-pitch pixels to a greater or lesser extent, depending upon whether a ridge or valley of the user's fingertip overlies a particular pixel in the array of finer-pitch pixels.

11. The fingerprint sensor recited by claim 10 wherein the switching devices included in the array of finer-pitch pixels are thin-film-transistors (TFTs).

12. The fingerprint sensor recited by claim 10 wherein the transmitter electrode extends substantially entirely around the array of finer-pitch pixels.

13. The fingerprint sensor recited by claim 10 further comprising:
   h) a cover layer overlying the upper surface of the substrate for receiving a fingertip of a user,
   wherein the substrate and the cover layer are integrally formed.

14. The fingerprint sensor recited by claim 10 wherein the substrate is relatively flexible.

15. A fingerprint sensor comprising in combination:
   a) a first substrate having a plurality of pixels formed therein, the first substrate comprising an upper surface, the pixels being arranged in a pixel array of R rows and N columns, each pixel comprising a switching device and further comprising a capacitive plate proximate the upper surface of the first substrate;
   b) a plurality of R row addressing electrodes, each such row addressing electrode being coupled to the switching devices of the pixels in a corresponding row of the pixel array for selectively enabling the switching devices in the corresponding pixel row;
   c) a plurality of N data electrodes, each such data electrode being coupled to the switching devices of the pixels in a corresponding column of the pixel array for sensing a signal provided by the capacitive plate of the pixel located at an intersection of a selected pixel row and the corresponding column of the pixel array;
   d) a cover layer overlying the upper surface of the first substrate for receiving a fingertip of a user;
   e) a plurality of transmitter electrodes formed proximate to the upper surface of the first substrate, each of said plurality of transmitter electrodes extending generally parallel to, and closely proximate to, a corresponding one of said plurality of row addressing electrodes, each of said plurality of transmitter electrodes selectively transmitting a varying amplitude electrical signal;
   f) said plurality of transmitter electrodes comprising a first set of transmitter electrodes located generally proximate to a selected row addressing electrode, and comprising a second set of transmitter electrodes located more distant from the selected row addressing electrode, wherein when the selected row addressing electrode selectively enables the switching devices in the corresponding pixel row, the first set of transmitter electrodes are disabled and the second set of transmitter electrodes are enabled to transmit the varying amplitude electrical signal;
   g) whereby the varying amplitude electrical signal transmitted by the second set of transmitter electrodes is coupled into a finger of a user who places his or her fingertip over the cover layer, and wherein the electrical signal coupled into the user's finger is further coupled through the capacitive plates in the pixel array to a greater or lesser extent, depending upon whether a ridge or valley of the user's fingertip overlies a particular pixel in the pixel array.

16. The fingerprint sensor recited by claim 15 wherein the switching devices included in the pixel array are thin-film-transistors (TFTs).

17. The fingerprint sensor recited by claim 15 further comprising:
   h) a cover layer overlying the upper surface of the substrate for receiving a fingertip of a user,
   wherein the first substrate and the cover layer are integrally formed.

18. The fingerprint sensor recited by claim 15 wherein the first substrate is relatively flexible.

19. The fingerprint sensor recited by claim 15 wherein the second set of transmitter electrodes is parallel to the first set of transmitter electrodes.

* * * * *